(12) United States Patent
Roytblat et al.

(10) Patent No.: US 11,743,386 B2
(45) Date of Patent: Aug. 29, 2023

(54) SYSTEM AND METHOD OF CONTROLLING AND IMPLEMENTING A COMMUNICATION PLATFORM AS A SERVICE

(71) Applicant: ANANCALL LIMITED, Richmond Hill (CA)

(72) Inventors: Igal Roytblat, Richmond Hill (CA); Jerry A. Sokol, Pickering (CA)

(73) Assignee: ANANCALL LIMITED, Richmond Hill (CA)

( * ) Notice: Subject to any disclaimer, the term of this patent is extended or adjusted under 35 U.S.C. 154(b) by 38 days.

(21) Appl. No.: 17/569,119

(22) Filed: Jan. 5, 2022

(65) Prior Publication Data

US 2022/0217236 A1 Jul. 7, 2022

Related U.S. Application Data

(60) Provisional application No. 63/134,237, filed on Jan. 6, 2021.

(51) Int. Cl.
*H04M 3/00* (2006.01)
*H04M 3/51* (2006.01)
*G10L 15/22* (2006.01)
*G10L 13/02* (2013.01)
*G06Q 30/016* (2023.01)

(52) U.S. Cl.
CPC ........ *H04M 3/5191* (2013.01); *G06Q 30/016* (2013.01); *G10L 13/02* (2013.01); *G10L 15/22* (2013.01)

(58) Field of Classification Search
CPC ... H04M 3/5191; G06Q 30/016; G10L 13/02; G10L 13/22
See application file for complete search history.

(56) References Cited

U.S. PATENT DOCUMENTS

2012/0254349 A1* 10/2012 Quigley ................. H04L 67/53
709/217
2020/0195529 A1* 6/2020 Park ........................ H04L 69/03

* cited by examiner

*Primary Examiner* — Rasha S Aubaidi
(74) *Attorney, Agent, or Firm* — TAROLLI, SUNDHEIM, COVELL & TUMMINO L.L.P.

(57) ABSTRACT

A system and method of controlling Communication Platform as a Service (CPaaS) system using data models to instruct microflows and respond to customer input during a customer interaction.

21 Claims, 22 Drawing Sheets

US 11,743,386 B2

SYSTEM AND METHOD OF CONTROLLING AND IMPLEMENTING A COMMUNICATION PLATFORM AS A SERVICE

FIELD OF THE INVENTION

The present specification relates generally to Communication Platform as a Service (CPaaS) systems, and more particularly to a system and method of controlling and implementing a CPaaS system.

BACKGROUND OF THE INVENTION

The following includes information that may be useful in understanding the present disclosure. It is not an admission that any of the information provided herein is prior art nor material to the presently described or claimed inventions, nor that any publication or document that is specifically or implicitly referenced is prior art.

For many businesses, provision of customer assistance and support is provided through centralized operation known as "call centers" or "contact centers". Historically, these contact centers were provided as voice communication over phone calls and this methodology has driven contact center technology development. As newer electronic communication channels (e.g. social media, or electronic chat) have become more prevalent, the contact center technology has been adapted for these channels.

The first contact centers routed phone calls by having people known as phone operators manually connect the caller to the person handling the call with a physical wire or switch. Digital technology progressed sufficiently in the 1990s to make Interactive Voice Response (IVR) systems (IVRs) that replace operators cost effective. These IVRs: 1) Answer the caller; 2) Provide "voice menus", a series of electronic voice prompts driven by the caller's touch tone entries or voice responses. The purpose of these voice menus is to classify the caller's request; 3) Assign the caller to assisted service (i.e. customer service agents) or a computer application to fulfill their request. If more assisted service calls are received than there are agents to handle them, these excess calls are placed in a queue to wait for the next available agent. Thus, IVR applications are intended to provide customer self-service for business functions that can be driven by customer phone input.

This simple description hides the complexity that exists in a real world enterprise contact center. The assignment to the "best" agent or application for handling or resolving the customer's issue depends on many factors.

Voice-based IVR systems have evolved to host more sophisticated voice applications that can be invoked during a customer call with to input to these applications provided by customer key entry and/or voice recognition. Some examples include validating a caller's identity, transferring funds between bank accounts, and creating a customer service ticket.

As part of the advancement of technology, voice-based systems (IVR) are being supplemented or replaced by other systems, including video, SMS, and MMS. Accordingly, the development of these technologies is being combined with cloud-based delivery models in what is now known as Communications Platform as a Service (CPaaS). CPaaS demonstrates similar overall functionality to historical IVR systems in providing an interactive user self-service platform for customer communications.

Referring back to the IVR example, when first introduced, IVR behavior was defined by custom programming in the popular programming languages at the time. As these languages did not have the native ability to deal with voice dialogs, in the early 2000s a consortium defined and approved a markup language for voice dialogs known as VoiceXML. Visual programming tools ("drag and drop" builders) first appeared in the mid-2000s.

These developments reduced the programming effort required. However, it did not change the fact that custom programs are being developed for every application used in a contact center. The resulting programs are tightly tied to the business operations as it exists at the time the program is written. Due to the realities of business and the factors, these programs are complex, expensive to develop and difficult to modify to meet changing business requirements. These issues continue to apply with the migration to CPaaS systems.

Another issue is that due to the complexity of these systems and difficulties in modification, many businesses, such as banks, are required to create and maintain multiple IVR systems where each system is assigned to a separate number for a separate customer department of the business. As a consequence, the customer is required to choose the correct number or else they will be directed or forwarded to a different number to access the proper IVR system. Accordingly, any previous input or communications are lost in the process, requiring the customer to restart with the new IVR system, resulting in increased call time and an inferior customer service experience.

Therefore, it would be desirable to have a system and method of controlling an CPaaS system which fully or partially mitigates some of the above disadvantages.

Accordingly, there remains a need for improvements in the art.

SUMMARY OF THE INVENTION

According to an aspect of the invention, there is provided a method of managing multiple real-time interactions with a Communication Platform as a Service (CPaaS) system, the method comprising the steps of: a) assigning a unique interaction ID to each interaction with a user; b) selecting a data model for each interaction based on a system endpoint and a customer endpoint for each interaction and associating the data model with the interaction ID, the data model representing the possible interaction sequences for the interaction, the data model compiled from one or more data tables, each data table comprising: a set of interaction states; one or more associated variables required for operation of each interaction state; and a state variable (PATH) value associated with the interaction state and the interaction ID. Step c) is receiving user inputs to the CPaaS system, each user input concatenated into the associated state variable (PATH) such that each state variable value corresponds to the sequence of user inputs received during the interaction for the associated interaction ID; and d) sending instructions to the CPaaS system to perform one or more microflows based on the data model and the state variable, each microflow comprising a set of responses to the user input and options for further user input, the instructions comprising variables from the data tables. Steps c) and d) are then executed as needed until the interaction is completed.

Additionally, each data model may be independent of the microflows such that multiple data models may instruct performance of one same microflow during operation. Similarly, the data tables may be independent of each data model such that each data table may be used in multiple data models.

Additionally, each data model may be locked to an existing version during the interaction such that each interaction proceeds under the existing version while the data model is being updated to a newer version.

Additionally, the method may further enable sending and receiving information from third party sources during each interaction and presenting the information to the user during the interaction. This information may be applied to modify the state variable for the interaction.

Additionally, the CPaaS system may comprise a text-based chat bot and the method may further comprise a step of converting user text input from the chat bot into voice instructions.

In an embodiment, the CPaaS system may comprise an Interactive Voice Response (IVR) system, the interaction is a call, the system endpoint is a number called by the user and the customer endpoint is a number the user is calling from. In this embodiment, the user input may result in selecting a new data model associated with a different number and changing to the new data model without requiring a change in the interaction ID or redirecting the call to the different number.

According to another aspect of the invention, there is provided a system for managing multiple real-time interactions with a Communication Platform as a Service (CPaaS) system, the system comprising: a) a central processing unit (CPU); b) a memory module coupled to the CPU; and c) a CPaaS system comprising a user interaction system. The system performs the steps of a) assigning a unique interaction ID to each interaction with a user; b) selecting a data model for each interaction based on a system endpoint and a customer endpoint for each interaction and associating the data model with the interaction ID, the data model representing the possible interaction sequences for the interaction, the data model compiled from one or more data tables, each data table comprising: a set of interaction states; one or more associated variables required for operation of each interaction state; and a state variable (PATH) value associated with the interaction state and the interaction ID. Step c) is receiving user inputs to the CPaaS system, each user input concatenated into the associated state variable (PATH) such that each state variable value corresponds to the sequence of user inputs received during the interaction for the associated interaction ID; and d) sending instructions to the CPaaS system to perform one or more microflows based on the data model and the state variable, each microflow comprising a set of responses to the user input and options for further user input, the instructions comprising variables from the data tables. Steps c) and d) are then executed as needed until the interaction is completed.

Additionally, each data model may be independent of the microflows such that multiple data models may instruct performance of one same microflow during operation. Similarly, the data tables may be independent of each data model such that each data table may be used in multiple data models.

Additionally, each data model may be locked to an existing version during the interaction such that each interaction proceeds under the existing version while the data model is being updated to a newer version.

Additionally, the system may further enable sending and receiving information from third party sources during each interaction and presenting the information to the user during the interaction. This information may be applied to modify the state variable for the interaction.

Additionally, the CPaaS system may comprise a text-based chat bot and the system may further comprise converting user text input from the chat bot into voice instructions.

In an embodiment, the CPaaS system may comprise an Interactive Voice Response (IVR) system, the interaction is a call, the system endpoint is a number called by the user and the customer endpoint is a number the user is calling from. In this embodiment, the user input may result in selecting a new data model associated with a different number and changing to the new data model without requiring a change in the interaction ID or redirecting the call to the different number.

For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein. The features of the invention which are believed to be novel are particularly pointed out and distinctly claimed in the concluding portion of the specification. These and other features, aspects, and advantages of the present invention will become better understood with reference to the following drawings and detailed description.

Other aspects and features according to the present application will become apparent to those ordinarily skilled in the art upon review of the following description of embodiments of the invention in conjunction with the accompanying figures.

BRIEF DESCRIPTION OF THE DRAWINGS

Reference will now be made to the accompanying drawings which show, by way of example only, embodiments of the invention, and how they may be carried into effect, and in which.

Like reference numerals indicate like or corresponding elements in the drawings.

DETAILED DESCRIPTION OF THE EMBODIMENTS

The present invention relates generally to Communication Platform as a Service (CPaaS) systems, and more particularly to a system and method of controlling and implementing a CPaaS system using data models to instruct microflows and respond to customer input during a customer interaction.

It is to be understood that the communication flow described herein represents the high-level interaction between a user and the system and/or the method. A communication flow is an implementation in a CPaaS for handling a customer interaction or some part of it and a microflow is implemented as a limited functionality communication flow executed by the CPaaS as defined below.

In an embodiment, the calling of a programmatic integration point from within a contact flow presents an opportunity to create contact flows that are limited in scope. These limited scope flows are referred to herein as "microflows". The microflows provide a specific function, and this limited functionality is available at a production level. The production level includes full error handling, illegal entry handling, and timeout handling in a reliable way. The microflows are implemented on the CPaaS. The microflows are programmed in the programming language of the CPaaS, or implemented using the tools of the CPaaS.

Figure 1:
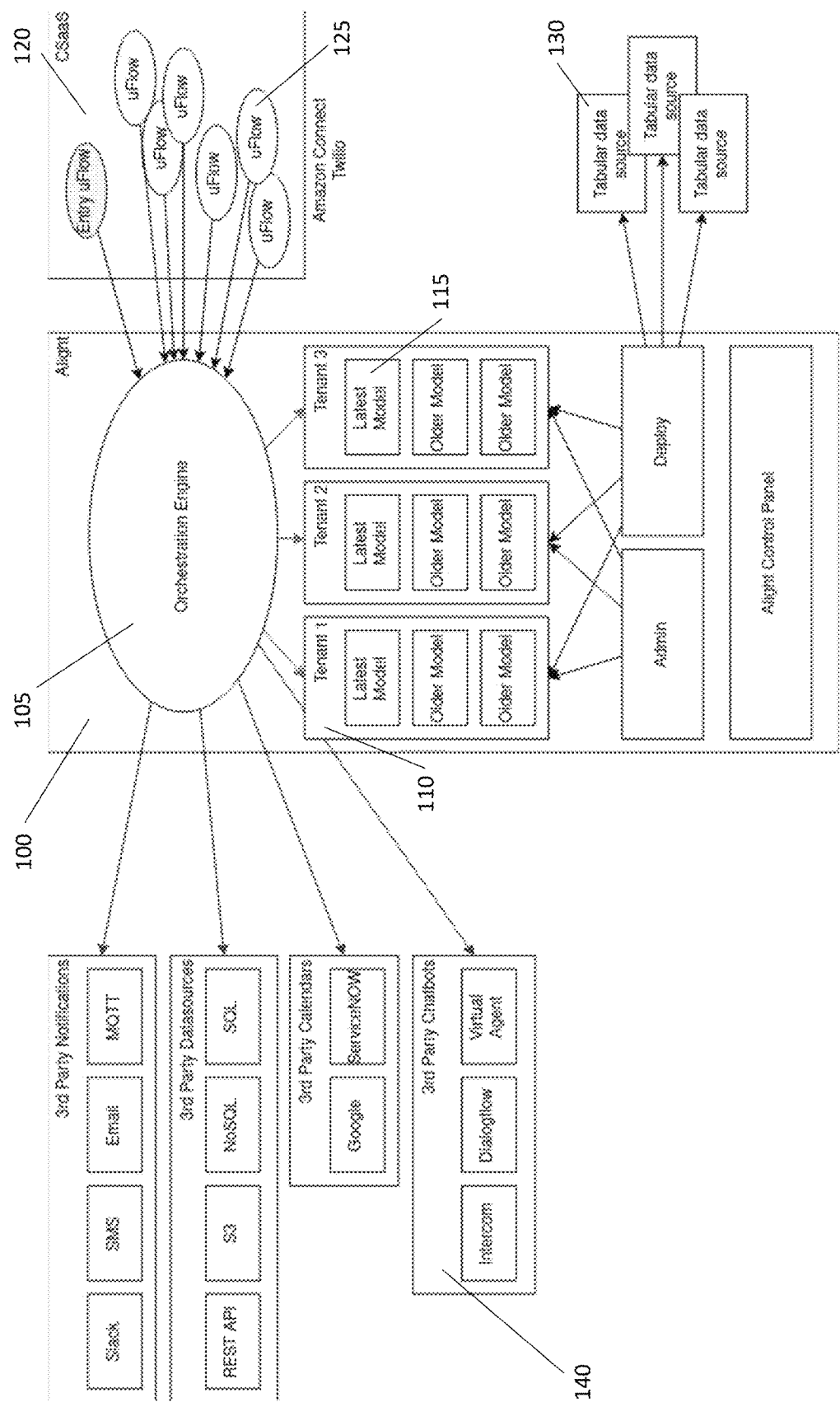
FIG. 1 depicts a block diagram of an orchestration engine according to an embodiment.

FIG. 1 illustrates an embodiment of the present system 100 as a block diagram. An orchestration engine 105 controls the interactions between a customer (tenant) 110 and a CPaaS system 120. The orchestration engine 100 access data models 115 within each tenant 110 to retrieve and send data to the microflows 125 within the CPaaS 120. Each data model 115 is constructed from a plurality of tabular data sources 130 which each contain the data required for a individual microflow 125. Separately, the orchestration engine 110 may send and receive data from a variety of third party sources 140 which may be applied to the data models 115 and/or the microflows 125.

Figure 2:
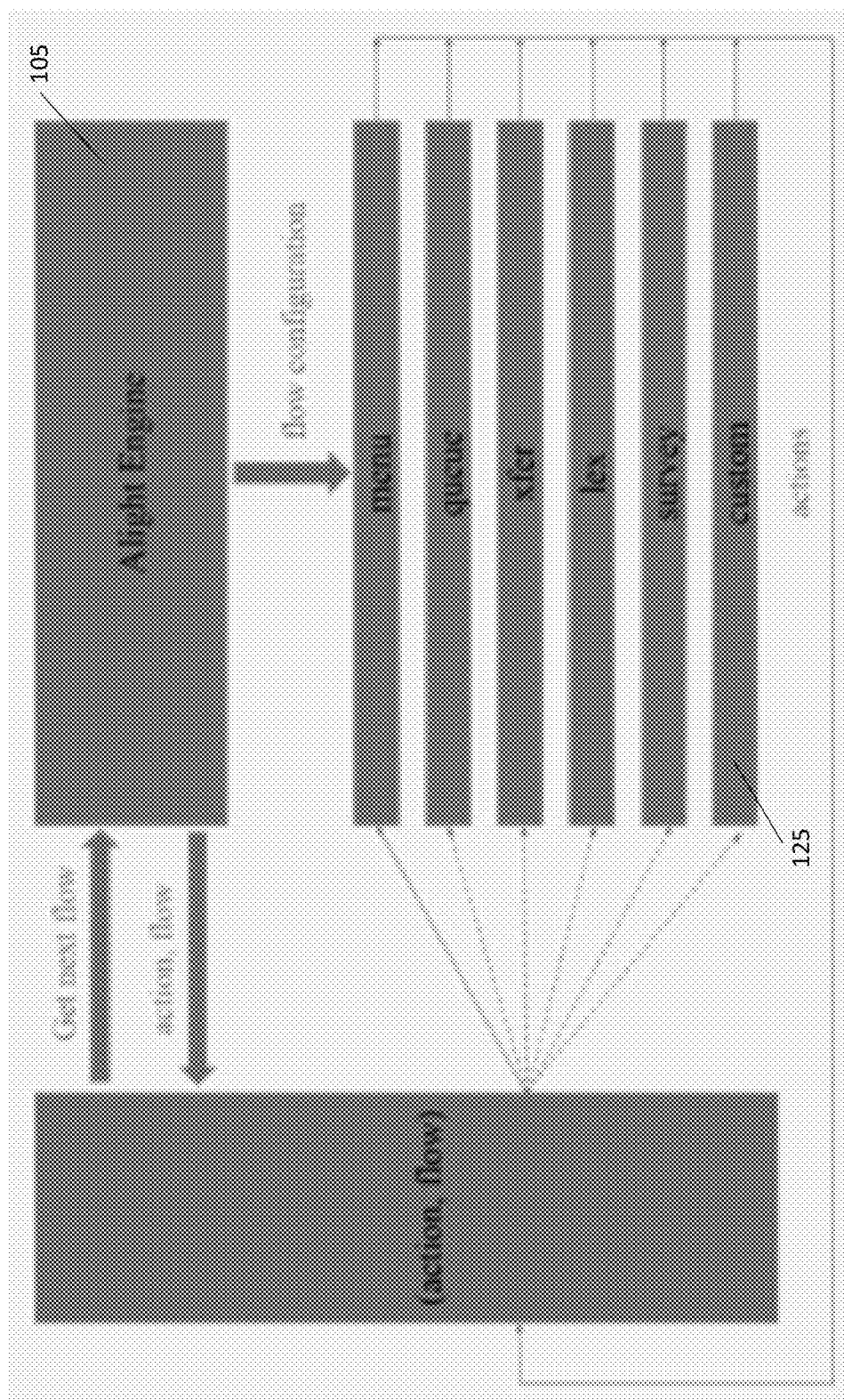
FIG. 2 depicts a schematic of an orchestration engine layout.
Figure 3:
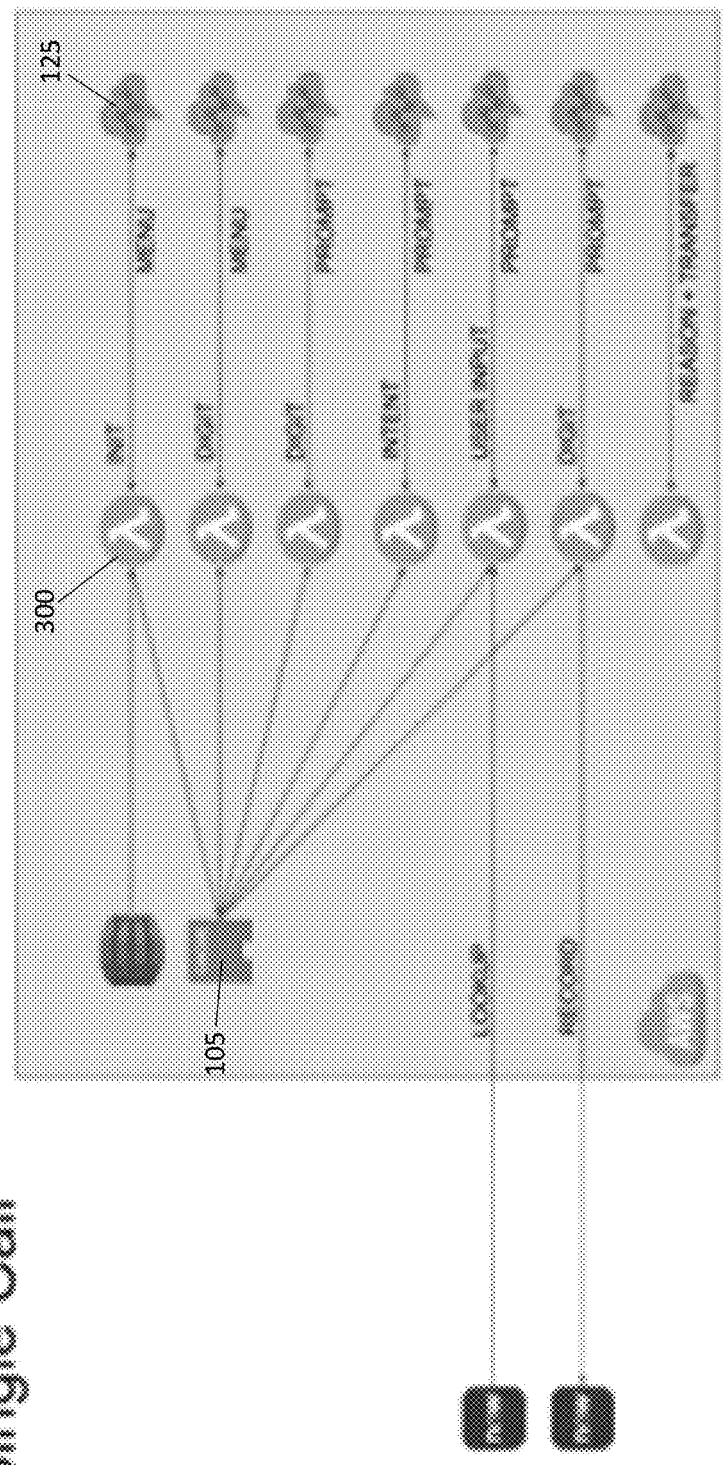
FIG. 3 depicts a schematic of a single call flow and the method to sustain session data.

Referring then to FIG. 2, the microflows in relation to the orchestration engine (e.g. in an embodiment, the Alight engine) 105 and FIG. 3 depicts the microflows 125 (on the right) interacting with the AWS (Amazon Web Services) Lambda integration point 300 (middle). Examples of microflows include, but are not limited to: presenting menu of options to the user and collecting the user's selection; sending a text or vocal prompt to the caller, such as "Welcome to our helpline"; and transferring the user to another section of the CPaaS such as a queue or a different interaction model as discussed below.

The combination of a collection of microflows with a Lambda function integration enables orchestration of the entire conversation flow using data schemes external to the microflows. The data schemes may be provided as a data graph representing the entire collection of options that the user can choose from a menu of options. While an example of the Lambda function is the Amazon AWS Lambda function other systems may be used.

Unlike in traditional computer telephony integration (CTI) and call-center technology, this approach herein orchestrates many microflows into a programmable interaction sequence. In an embodiment, the data is externally stored as a data model of the interactive response system, and fed step by step to the CPaaS in response to the user's input. In another embodiment, the data is externally stored as a data model of the IVR system, and delivered to the CPaaS as programmatically required by the orchestration engine to the microflow. In various embodiments, the CPaaS may be Amazon Connect or Twilio Flow. The model may be plain text, and/or tabular data. For performance reasons, tabular data is preferred over plain text. The tabular data may be stored in a spreadsheet such as comma separated values (CSV), MICROSOFT spreadsheet, GOOGLE spreadsheet, or other known spreadsheets. The tabular data may be stored in a relational database such as MYSQL, POSTGRES, MSSQL, or other known relational databases. The tabular data may be stored in a NOSQL database such as MONGODB, CASSANDRA, DYNAMODB, or other known NOSQL databases.

Figure 4:
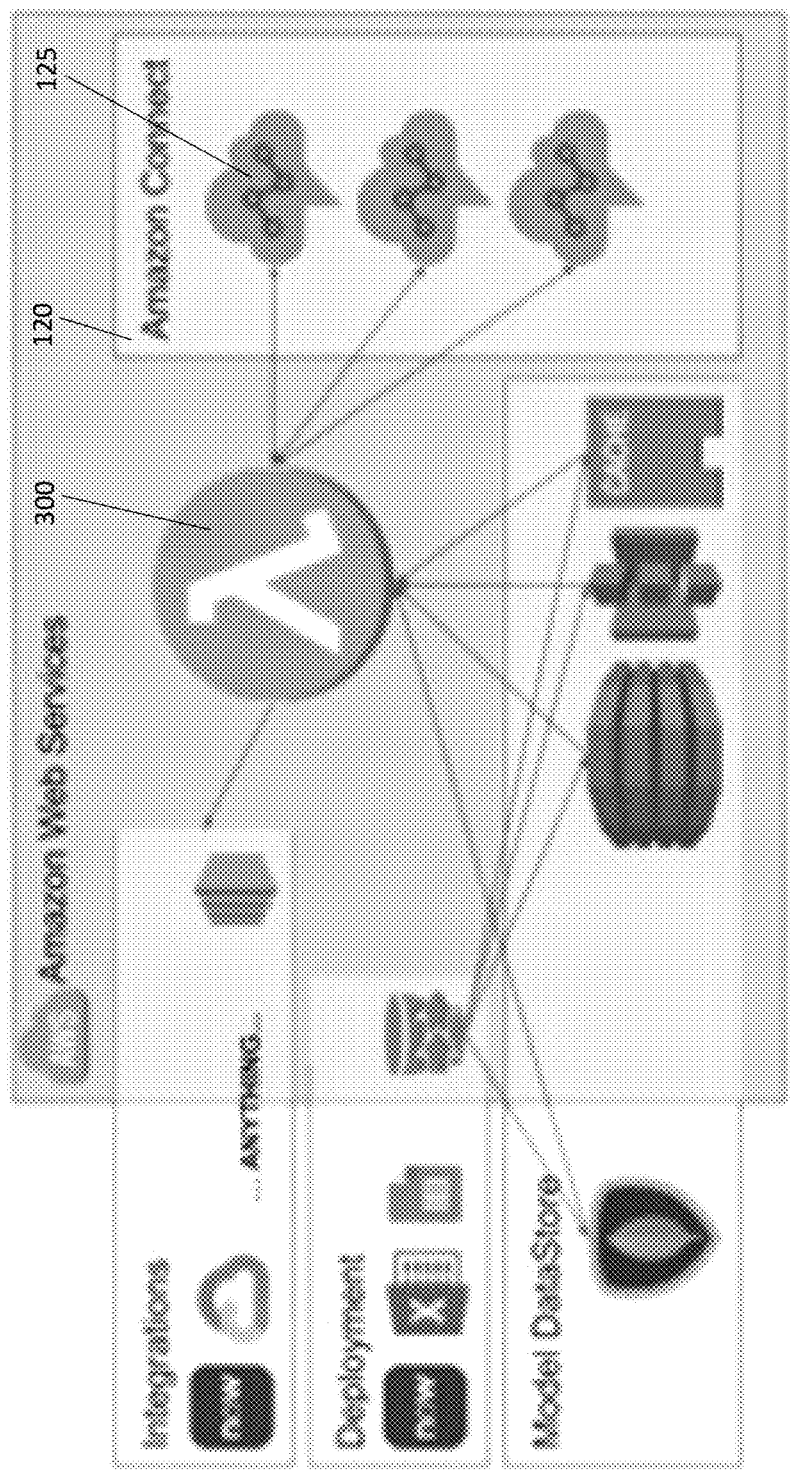
FIG. 4 depicts a schematic diagram of components and integration points.

A feature of the integration point is being stateless. FIG. 4 depicts an embodiment where a stateless Lambda function can maintain state and context using parameters passed back and forth from the microflow 125 to the Lambda function 300 and back. In an embodiment, the integration point is a Lambda function such as AMAZON WEB SERVICES (AWS) LAMBDA. In an embodiment, the integration point or the Lambda function call in the microflow allows for the retrieval of data from the data model that is required for the microflow to continue.

In an embodiment, the communication flow is represented in the tabular form as discussed above. Conceptually, every line in the table represents a state of the communication flow and every column represents a different variable. The main variable that identifies the state is called PATH. The PATH is the concatenation of the user input selections over the course of the communication flow. The following Table 1 illustrates an example of the use of a PATH in an CPaaS operating an IVR system:

TABLE 1

| Selected Option | PATH | Announcement |
| --- | --- | --- |
| 2 | 2 | For sales, press 1, for support, press 2, for help, press 3 |
| 1 | 21 | For existing issues, press 1. For new issue, press 2 |
| 1 | 211 | For wireless, press 1. For Internet, press 2 |
| 2 | 212 | For wireless, press 1. For Internet, press 2 |

A potential exception to automatic input appending to the PATH may occur in two cases: when the user provides an input that takes them back to a previous option, such as "press * to return to main menu" will change the PATH to the main menu option instead of appending the * to current PATH; and when the caller is asked to key in a credential such as "please enter your account number". The account number is not appended to the PATH although it was entered by the user, although it can be stored for use later in the interaction, if needed.

In an embodiment, the tabular data can be expanded on with additional tables by adding two variables. The variables are represented by columns in the table. The first variable will represent the table identifier and the second variable will represent the row identifier. Using the two variables, the identified row will be appended to the source row in the state table creation for a dynamically expandable format.

For example, as shown in Tables 2A and 2B, if the State table for a PATH value of 105 has a reference to a 'menu' action and it points to a menu entry 'menu-entry-8', the combined model will result in an entry path 105 that is comprised from all the values of row 105 of the State table and row menu-entry-8 of the Menu table. Also, due to the nature of tabular information, the column headers of the menu table and the state table should avoid containing identical column names.

TABLE 2A

| PATH | Data | Action | Action Entry |
|---|---|---|---|
| ... | | | |
| 105 | Some data | menu | menu-entry-8 |
| ... | | | |

TABLE 2B

| entry | Prompt | Key 1 | Key 2 | Key 3 |
|---|---|---|---|---|
| ... | | | | |
| menu-entry-8 | For sales press 1, For support press 2 | true | true | false |
| ... | | | | |

Following the data in these tables, the model outcome will be:

Data="Some data",
Action=menu
Action Entry=menu-entry-8
Prompt=For sales press 1, For support press 2
Key 1=true
Key 2=true
Key 3=false The following Table 3 is a list of the most common mandatory and optional tables used in the data models:

TABLE 3

| Name | Mandatory/Optional | Description |
|---|---|---|
| Entry | Mandatory | Initial entry points and call setup |
| State | Mandatory | All possible states based on PATH and/or INTENT |
| Menu | Mandatory | All the menus with menu prompts and possible user selections |
| Queue | Mandatory | List of all the available queues |
| System | Mandatory | A collection of built in system features |
| User | Optional | A collection of user defined features |
| Other | Optional | Any customizations are possible by adding custom microflows and corresponding tables and entries |

As communication flow data can be sourced from many different sources, as described above, the method and system converts the tabular data to a common, uniform and optimized data structure. In an embodiment, the conversion of the tabular data into the data model occurs during the deployment stage, when time is not critical, the deployment process may also optimize the data model structure for fast retrieval as the data retrieval happens during the interaction with the user in real time.

As the data model is constructed from the separate data tables, changes and updates may be performed by merely changing the appropriate data table and recompiling the data model. For example, changing names may be accomplished by changing the appropriate data field in the appropriate data table. Or, adding new options, such as a new employee to a directory, requires the addition of a new row to the data table and may even be performed as a copy/paste function, particularly where multiple changes or additions are needed.

In another embodiment, it may also be possible to edit the data model directly, using an appropriate editing tool, without editing the source data tables. However, the edited data model must still be deployed in order to be assigned a version number, and there is a risk that the associations with the data table may be broken and require further editing to correct.

Also, where multiple CPaaS systems have a commonly used microflow, often instructed by the entry data table, such as language selection, the same data table may be used in creating the different data models for the multiple CPaaS systems, reducing workload and simplifying the process of making global changes.

In an embodiment, the data model is constructed by storing each state data (one row of the state table) including expansion of the data from additional tables and substitution of any modifiable values such as template values or variables into a single JSON object in a model datastore. As depicted in the "deployment" block of FIG. 4, a model datastore could be an identifiable directory in the filesystem with all the state JSON elements as stored files or a NoSQL database such as MongoDB or DynamoDB.

The data model may be stored in a multi-level cached filesystem that can include in-memory storage, local file system, cloud bucket storage or NoSQL databases as described in the "Model Datastore" block of FIG. 4.

To allow the deployment of tabular data as data model from many different sources, such as Excel or Google Spreadsheets or SQL databases, a dictionary table is used as a translation tool from the data source to the data model tables and entries names.

Operationally, the data tables, data models and orchestration engine of the system are all independent and are decoupled from each other. Different data tables, set up for the same contact center configuration, will create identical data models. This characteristic allows for virtually any environment that can host tabular data to act as a data table.

When a data model is created, it is identified by a name, a timestamp and optionally a version number.

When a user interaction (such as an IVR phone call) connects, the execution engine dynamically selects an appropriate data model. This selection is based on factors such as, but not limited to, the system endpoint (e.g. the IVR phone number called by the caller), time of day, current volume of interaction, etc. The data model is then selected by name.

Optionally, the customer endpoint (e.g. inbound calling number answered by the IVR or an IP address) may also be used in selection of the data model. For example, a customer endpoint with a Canadian area code or IP address may then select a data model with a language selection option between English and French to send to the appropriate microflow, whereas when a United States area code or IP address is detected, the data model selected may have the language selection option between English and Spanish.

By default, the named model with the latest timestamp or version number is selected. However, an earlier model may be explicitly selected, if desired. Unless an explicit transfer to a different model is performed during the conversation, the model will be used for the entire conversation. This is the case even if a new model of that name is deployed during the conversation (becoming the new "latest" model)

The orchestration engine 105 concurrently handles any number of interactions, each independently using the selected data model for the duration of the interaction.

Figure 5:
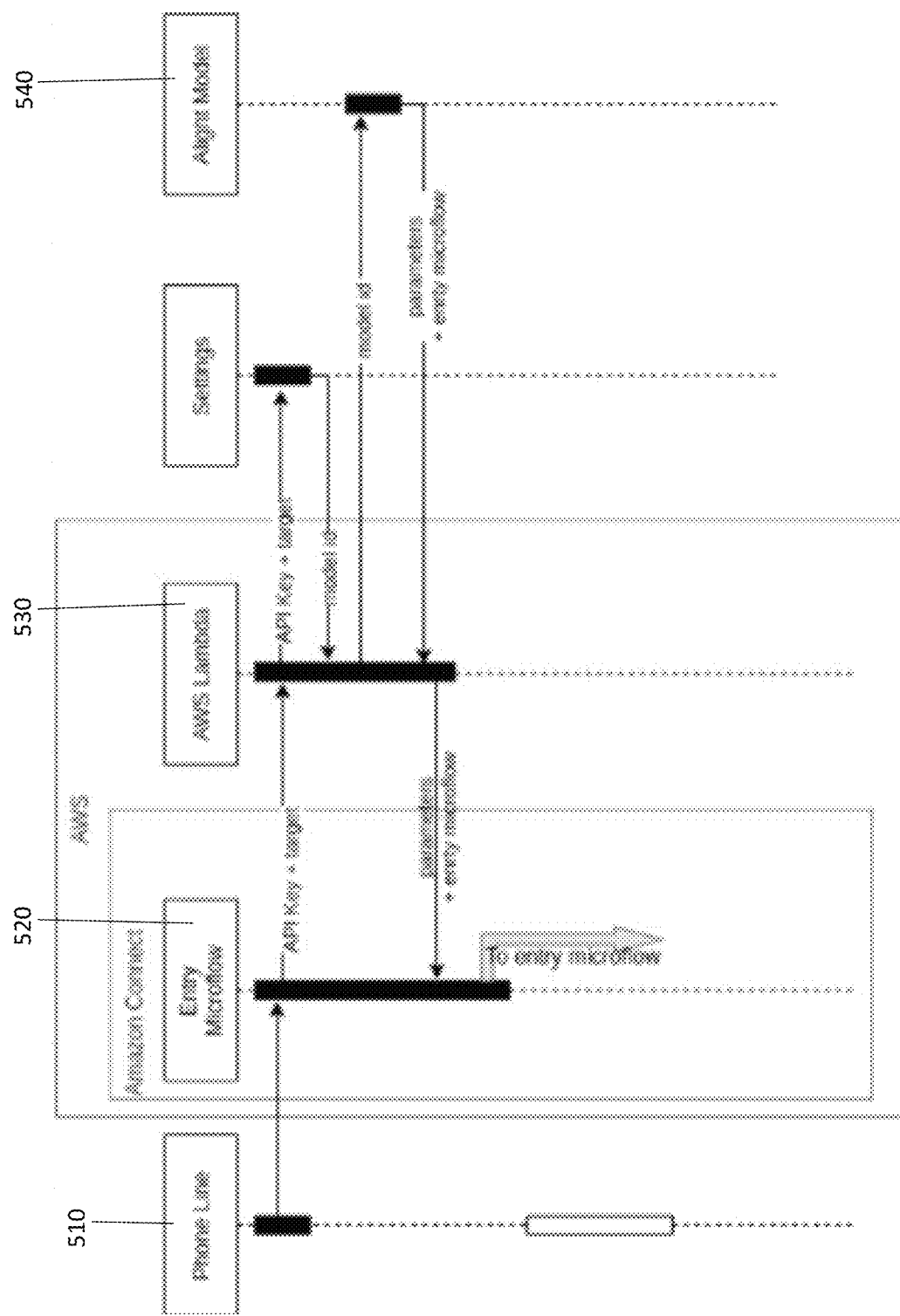
FIG. 5 depicts a communication flow at initialization.

For example, in an IVR embodiment, as shown in FIG. 5, a call 510 is introduced into the method and system by Amazon Connect on one of the assigned phone numbers which automatically invokes the entry microflow 520. The entry microflow 520 assigns the appropriate API Key and calls the Lambda function 530 that uses the API key to identify the correct model 540. The unique model ID is returned and kept within the system for the entire call session. Every call to the Lambda function includes the unique model ID.

Alternatively, the API key can be looked up in an external lookup table that maps the incoming phone number (system endpoint) to an API key.

In addition to the API key that selects the model, there is also a notion of a "target" that represents development, staging, production or other possible targets. Each target might use different versions of the same data model. The combination of API key and target will uniquely identify the model id that needs to be used.

The initialization phase ends with the handoff of control to the entry microflow to perform announcement, menu or other functions as specified for the specific use.

In an embodiment, due to the use of the same microflows that are orchestrated by an external data model, and the fact that microflows are simultaneous and reentrant (as they need to service multiple simultaneous calls), it is possible to apply different models on different calls as long as a call is uniquely identified.

The implication of multi-model support is that an enterprise level contact center may use different models for different departments, products or divisions. Each model may then be administered securely by an assigned administrator for that department, product or division. This feature also allows for multi-tenant utilization of a single microflow collection instance such as Amazon Connect instance or Twilio Flex.

For example, a large corporation, such as a bank, may have departments for consumer banking, business banking, credit cards and investing, as a non-exhaustive list. Historically, with prior art IVR systems, each department requires its own IVR system, with separate numbers for customers to call to access the IVR. Further, each IVR system is self-contained, with each containing all the required flows for end-to-end service. Accordingly, a customer must be transferred between IVR systems by calling a different number when it is determined that the current IVR system is not suited to fulfilling their request. Or, when a customer service representative transfers the customer to another IVR system or part of the IVR system, and the transfer results in the customer having to enter at the call in entry point (and therefore restart their communication flow with the IVR system and lose any information collected from the customer before the transfer).

The present multi-model support allows for the replacement of multiple IVR systems with multiple data models. Thus, while each department has its own data model, when a customer is required to be directed to a different department, the system can assign the customer to a different data model without the need to transfer or call a different number. The transfer of the customer to a different data model without losing the information collected from the customer before the transfer.

The orchestration engine may further be connected to third party data sources, as seen in FIG. 1. These data sources may include databases, notification systems, calendars and chatbots. In an embodiment, the orchestration engine may access third party (external) services (e.g. Slack, SMS, email, MQTT) and post data or gather data via REST APIs, or databases (SQL or NoSQL). This posting and gathering of data may in turn modify the progression of the communication flow based on the data. For example, the orchestration engine may check a schedule on a third party calendar (e.g. Google Calendar or ServiceNOW) and modify the interaction based on calendar availability.

Another option is the use a voice-to-text engine to convert a user's vocal instructions into text, sending that text to a third party chatbot, receive the chatbot response, process the response (if needed) into an utterable sentence, and convert the response into vocal audio output using text-to-speech. For example, the microflow may present options as "press 1 for option 1 and press 2 for option 2" or "say 'ONE' for option 1 and say 'TWO' for option two". This process works similarly to third party data source integration, and eliminates the need to incorporate this functionality directly into the CPaaS system.

Another example of the orchestration engine is the enablement of AI-based chatbots for voice interactions ("voicebots") within Alight or a similar CpaaS system. Such chatbots are designed to run in a text window wherein the user types a request and the chatbot responds with a text reply or a selection box. The interaction continues with the user entering a test response or choosing one of the selections.

Given the resources required to develop and test these chatbots, and the prospect of devoting even greater resources to develop and test voicebots, the potential to reuse existing chatbots and other systems may preserve the initial investment and may limit the scope of further investment required.

Accordingly, in an embodiment, the orchestration engine may emulate the text interface for the chatbots, eliminating the need for changes to the chatbot. Then, the orchestration engine executes a data model for the necessary microflows, including 1) accepting both voice and key input from the user; 2) converting the chatbot text and selections into voice prompts and voice menus; and 3) providing a mechanism to leave the chatbot and enter a different communication flow. The conversation process further includes conversion from text interaction to voice interaction as necessary, such as replacing "type" with "say", and on-screen buttons with keypress options ("Press 1, 2 or 3"). Additionally, text information which is not suitable for conversion to voice (such as a hyperlink or image) may be identified and sent through an alternative channel, such as SMS or MMS.

The present multi-model support further enables the system to store the user input data from the starting call and share it with the new model upon transfer. This user input data may include not only the PATH variable, but also other inputs such as login credentials, customer identification data (e.g. name, birthdate, card number, etc.). Accordingly, when changing data models, the new model also need not be entered at the start/entry point, but may take the transferred user data and enter the new data model at any point, eliminating the need for the user to re-enter data and/or credentials into the new model.

For example, a banking customer may call into a credit card IVR system, however, on proceeding through the data model, their request requires fulfillment from a fraud department, which operates on a separate IVR data model with a separate contact number. The user may then be transferred to the fraud data model by reassigning the data model without the need to call into or transfer to the fraud contact number. Further, the user data and input already submitted may be transferred as well, allowing information such as credential verification and card number to be provided to the fraud data model. Thus, the experience is provided in a more accessible and seamless presentation to the user, and the overall engagement time in the overall IVR system is reduced, improving call handling and shortening queues.

The same Multi-Model support also allows the application of the same model in development (dev), stage, production (prod), and possibly other modes. In a possible staged deployment scheme, a model is deployed to a dev model after it is tested and can be promoted to stage or prod level. This scheme allows for safe deployment, testing and rollback functionality that is not available under current contact centers technologies. Every deployed version is tagged and timestamped and can be reverted to at any time.

The same Multi-Model support also allows a single call to transition between multiple models within a single call in a secure fashion, regardless of the data source used to create each model. This provides a simple and secure mechanism to partition a large deployment while providing an administration interface in the native application used in each partition.

To avoid breaking ongoing calls in the middle of a deployment process, the exact model name is attached to every Lambda call so that a call that started with a specific version will run its course with the same version of the model even if another, newer model is available as discussed above. This feature allows for hot deployment of new models without taking the contact center offline for maintenance.

As another example, two companies, Corporation A and Corporation B Inc, are customers and have deployed an embodiment of the method and system. Each company creates their own, unrelated call centers or contact centers using their own IVR.

Figure 6:
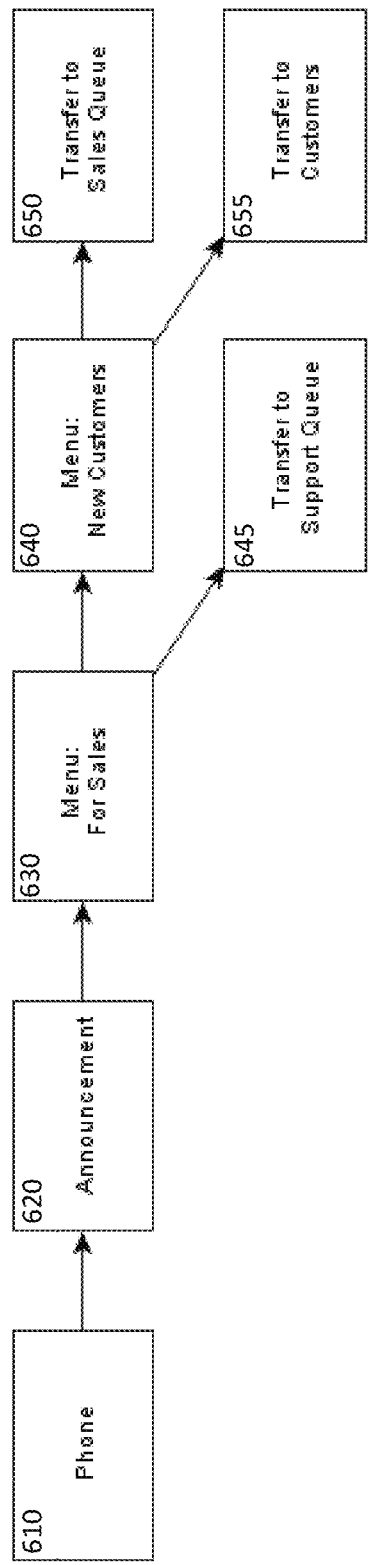
FIG. 6 depicts an example IVR.

FIG. 6 shows the basic communication flow for an example IVR for Corp. A. The tabular representation of the IVR communication flow for Corp. A is shown in Tables 4A and 4B. In this example, the call 610 comes from an unknown number so the communication flow starts at PATH 1 (Entry point of Init table), and an announcement microflow 620 is called based on the data model for the IVR, i.e. play announcement "Welcome to Corp. A", and then the next path is PATH 5. The data, which represents the content of the announcement, may be fetched from the data model using an integration point or Lambda function call from within the announcement microflow. Now, PATH 5 will call the menu microflow 630 and present the menu data and wait for a response from the caller. If the response input is 1, then go to PATH 51; or, if the response input is 2, then go to PATH 52. Then, PATH 51 or 52 is next, and PATH 51 will call the menu microflow 640, and PATH 52 will call the transfer microflow 645. The call to the menu microflow 640 will proceed as described above. The call to the transfer microflow 645 will result in the caller being placed in the support queue, and the transfer microflow 645 will terminate or end as programmed. PATH 511 and 512 will operate to call their respective microflows 650, 655 in the same manner as described above for the transfer microflow 645.

TABLE 4A

| Calling Phone # | Called Phone # | Entry Point | Locale |
|---|---|---|---|
| any | any | 1 | en |
| any | +15551231234 | 8 | en |
| +11234567890 | +19876543210 | 5 | fr |

TABLE 4B

| PATH | Type | Data | NEXT PATH |
|---|---|---|---|
| 1 | announcement | Welcome to Corp A | 5 |
| 5 | menu | For sales press 1, For support press 2 | |

TABLE 4B-continued

| PATH | Type | Data | NEXT PATH |
|---|---|---|---|
| 51 | menu | New customers press 1, Returning customers press 2 | |
| 511 | transfer | sales queue | |
| 512 | transfer | customer care queue | |
| 52 | transfer | support queue | |

Figure 7:
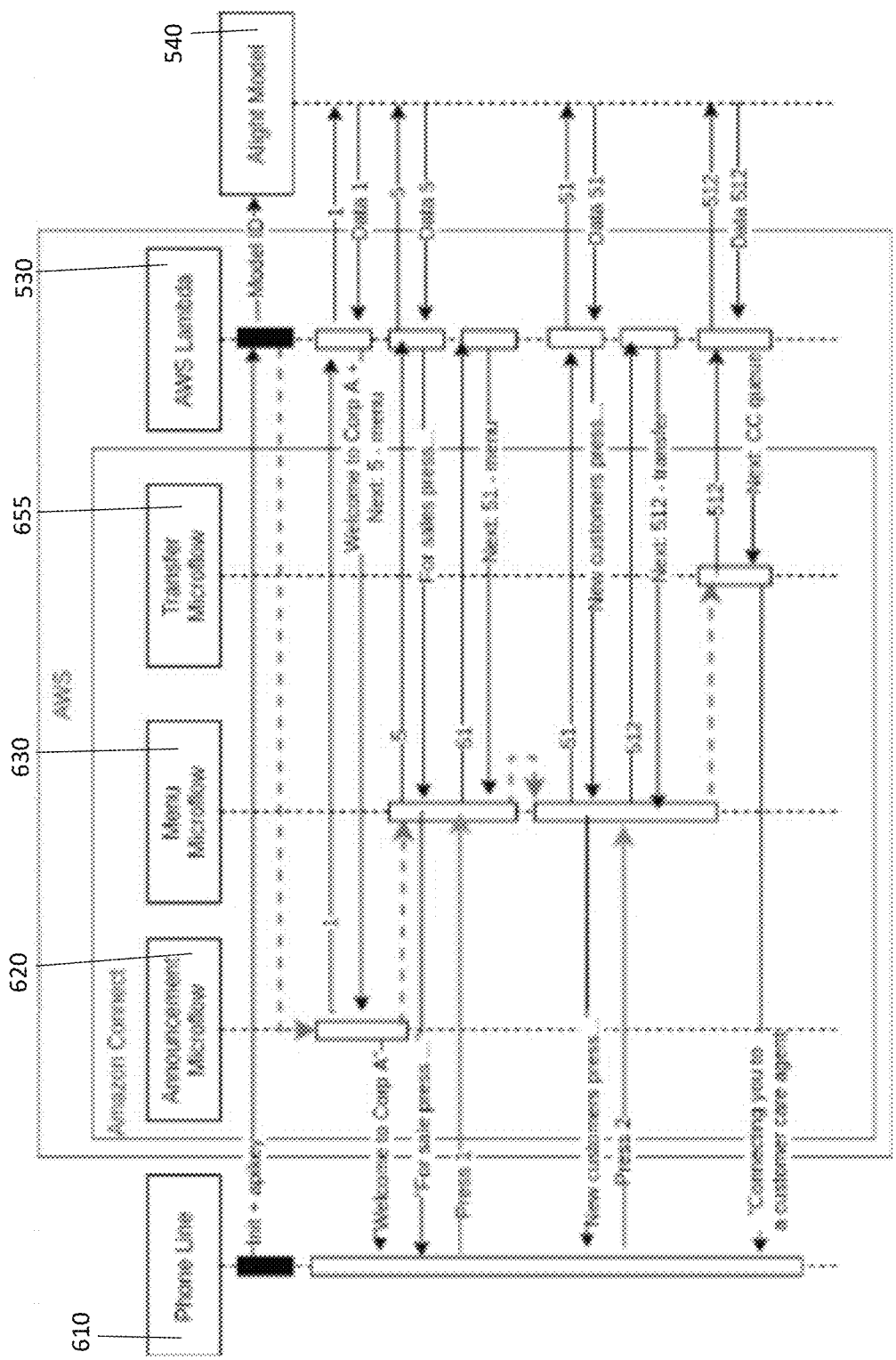
FIG. 7 depicts a communication flow for the example IVR of FIG. 6.

Referring now to FIG. 7, the sequence of events from FIG. 6 as it happens in the method and system when the caller selects the options 1 ("sales") followed by 2 ("returning customers") is shown. The details of the initialization process (black filled boxes) are described above. The dashed arrows show control handoff from one microflow to another. The arrows from the phone line 610 to the menu microflow 630 represent user menu selections (key presses).

Figure 8:
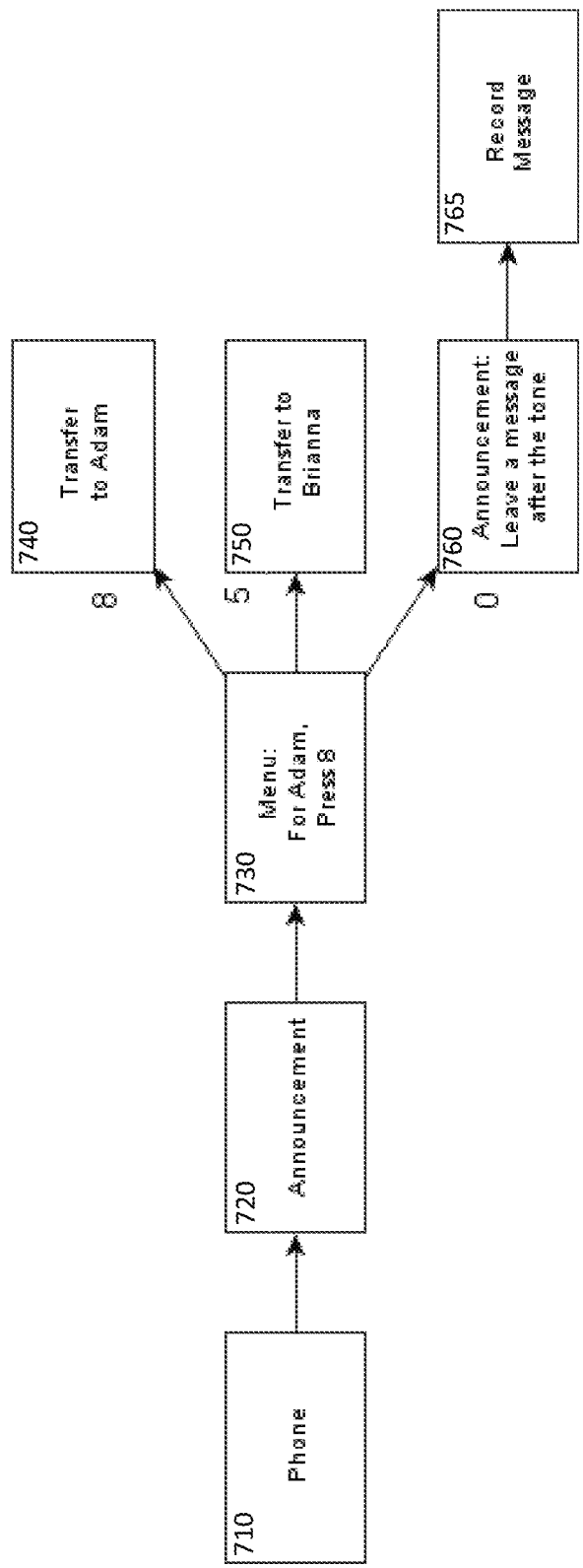
FIG. 8 depicts an example IVR.

FIG. 8 shows the basic communication flow for an example IVR for Corp. B. The tabular representation of the IVR communication flow for Corp. B is shown in Table 5. Similar to above, an inbound call 710 leads to the announcement microflow 720. The menu microflow 730 is then activated and the used is presented with menu options. In response to the user keypress enter, transfer microflows 740, 750 or announcement microflow 760 are triggered accordingly. In this case, announcement microflow 760 then leads to a recording microflow 765 for the use to leave a voice message.

TABLE 5

| PATH | Type | Data | NEXT PATH |
|---|---|---|---|
| 1 | announcement | Welcome to Corp A | 2 |
| 2 | menu | "For Adam, press 8 For Brianna, press 5 To leave a message press 0" | |
| 28 | announcement | "Transferring to Adam . . . " | 285 |
| 285 | transfer | forward to Adam's cell phone number | |
| 25 | announcement | "Transferring to Brianna . . . " | 253 |
| 253 | transfer | forward to Brianna's desk phone extension | |
| 20 | announcement | "Please leave a message after the beep" | 555 |
| 555 | record | Voicemail recording | |

Figure 9:
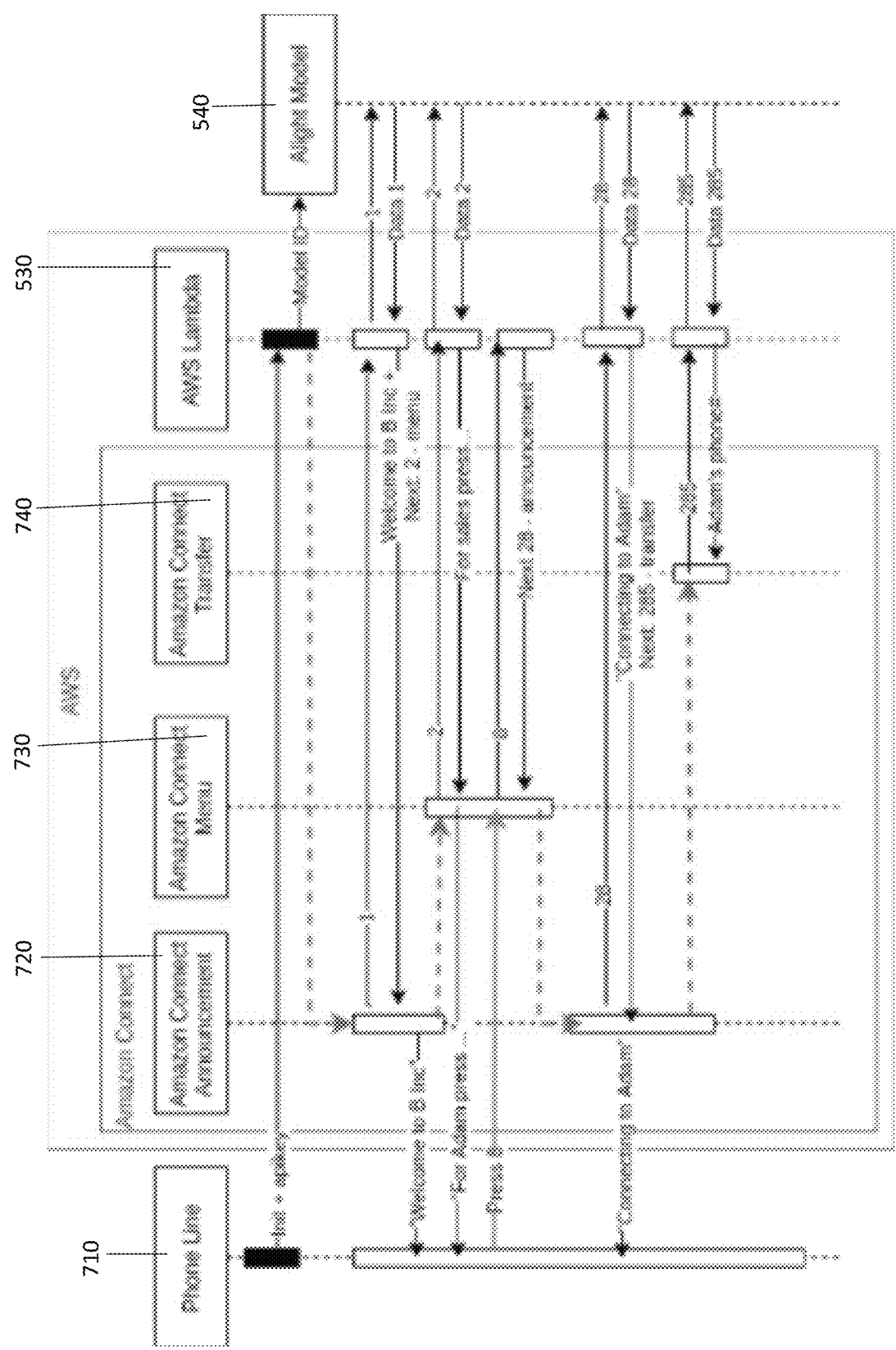
FIG. 9 depicts a communication flow for the example IVR of FIG. 7.

Referring now to FIG. 9, the sequence of events as it happens in the method and system for when the caller selects the menu option 8 ("Transfer to Adam") is shown.

For both examples, when a call is initiated, the initialization process together with the API key (which is attached to the phone number) are driving the selection of the appropriate data model. This model controls the rest of the communication flow. The data model provides the parameters to the current microflow (by following the information in the table, as shown in Table 3 and Table 4) and the next microflow to hand control over to.

In these embodiments, although the IVR communication flows are very different between the two companies, the microflows and the functions that are used are identical and therefore reusable. The difference is with the orchestration sequence. The initialization call also initiates the first microflow to be activated (announcement at entry point 1). After that, every microflow will get the necessary operational parameters from the lambda function which in turn pulls it from the appropriate data model.

In these embodiments, every microflow starts with a call to the Lambda function to get its (just-in-time) operational parameters. In addition to the parameters the Lambda function also gets the microflow ID to which to transfer control after the completion of the current microflow operation.

Both companies can use the same instance of the programmable call center (e.g. Amazon Connect) and lambda function at the same time because the call centre infrastructure is, by nature, re-entrant and allows multiple calls to be handled simultaneously. Having the communication flow orchestrated by the data model allows both companies IVRs to operate simultaneously on a single Alight instance.

Figure 10A:
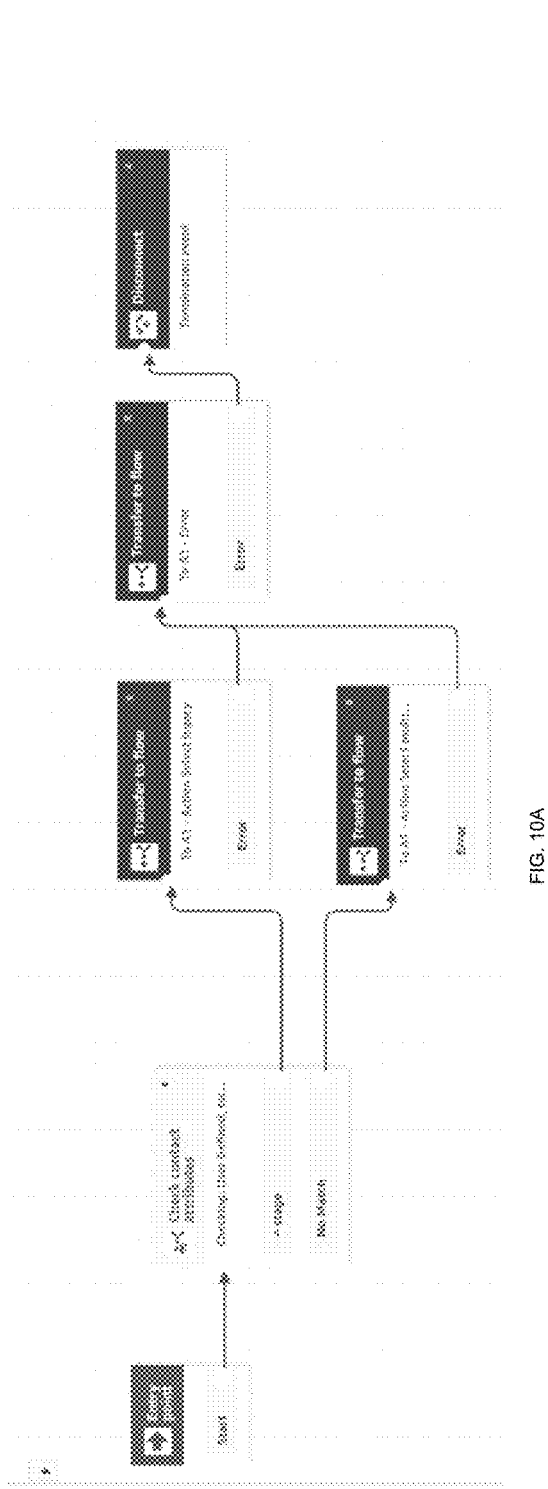
FIGS. 10A-10S depict example implementations of microflows using Amazon Connect.
Figure 10B:
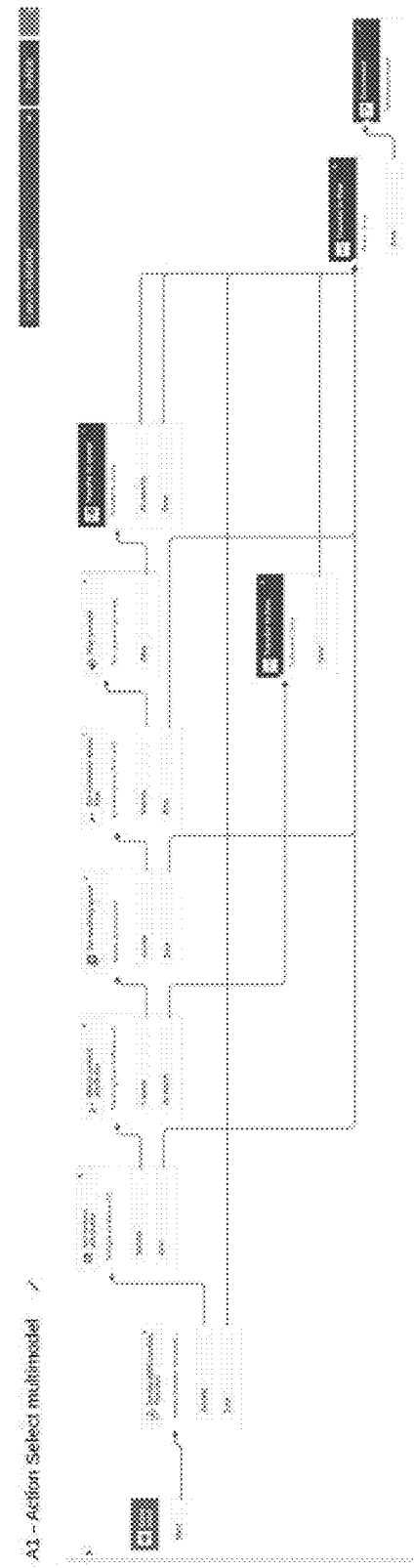
Figure 10C:
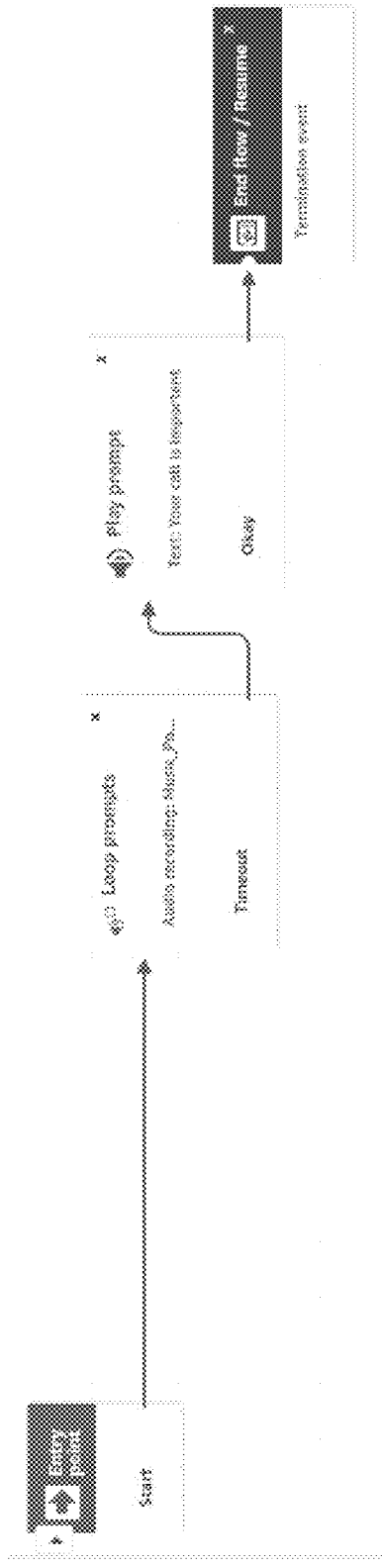
Figure 10D:
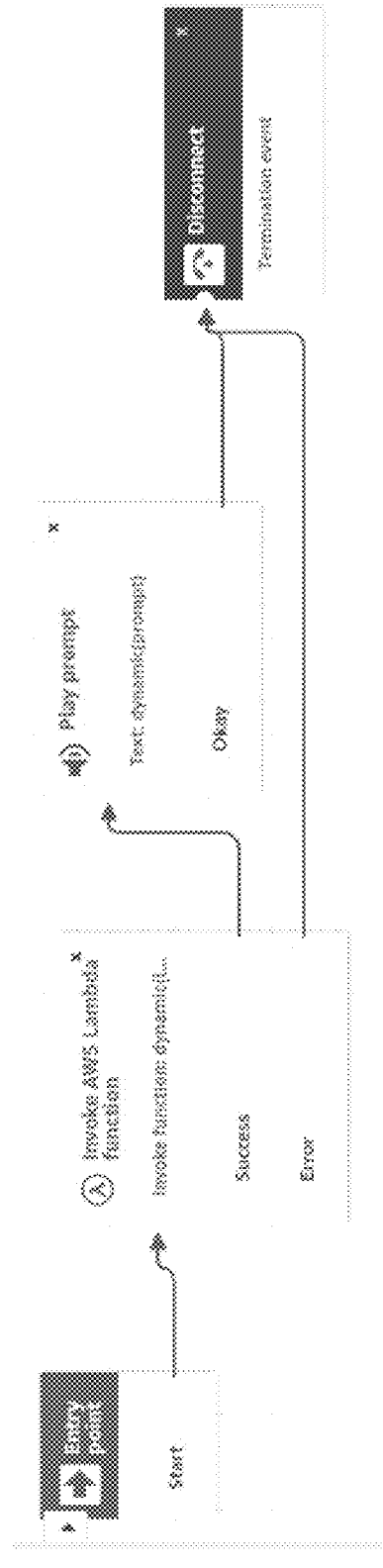
Figure 10E:
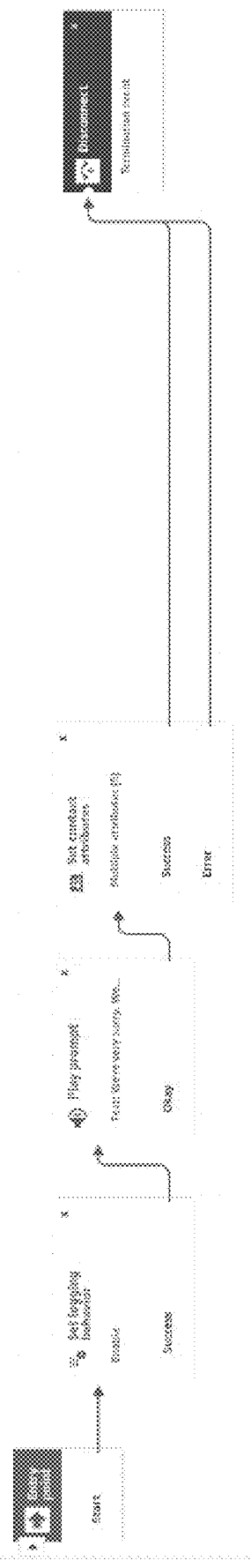
Figure 10F:
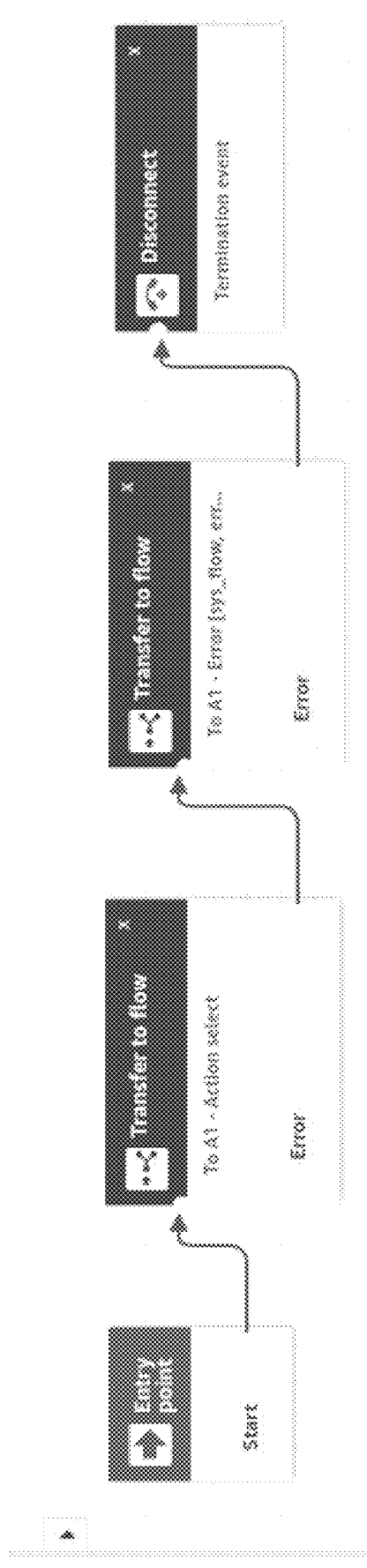
Figure 10G:
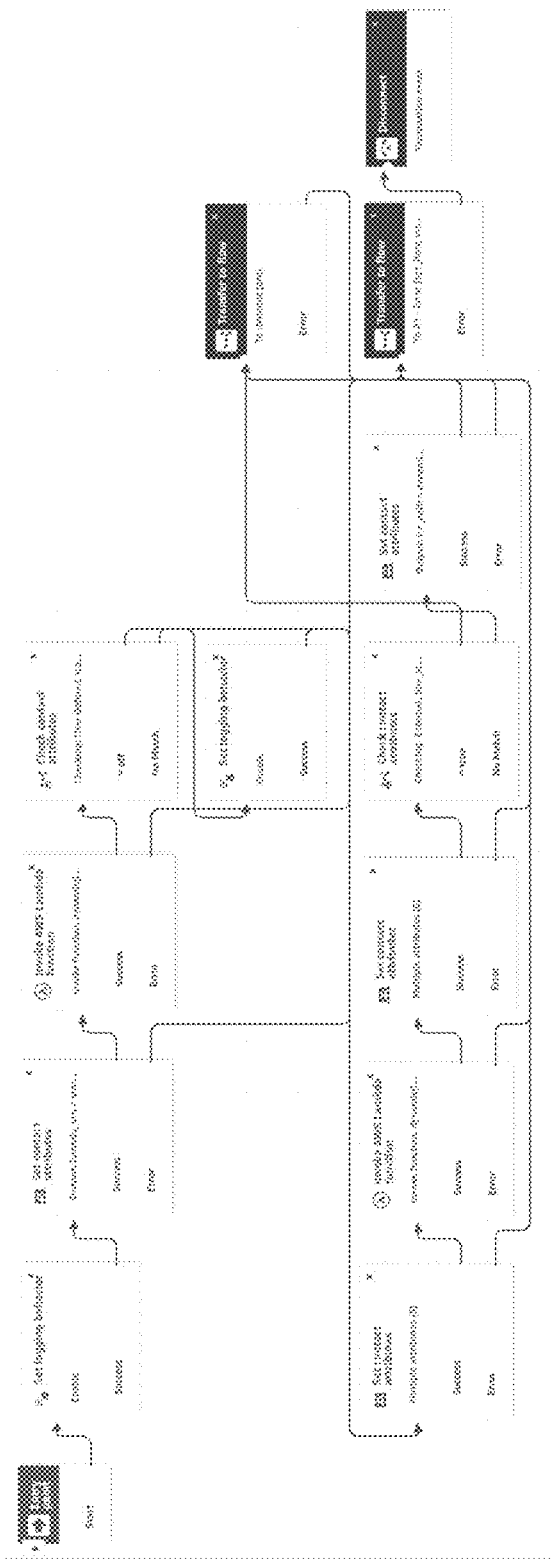
Figure 10H:
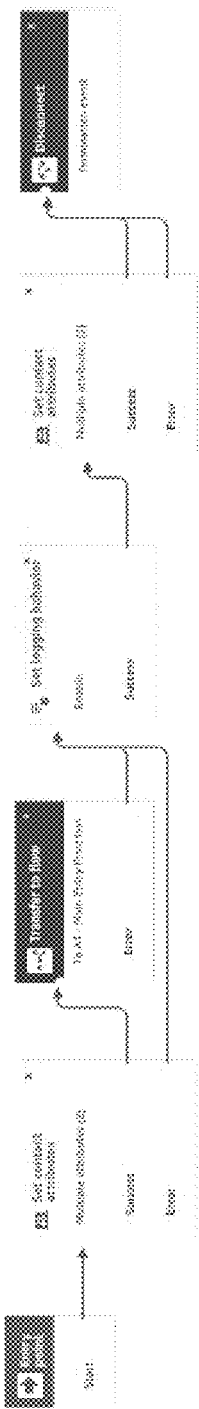
Figure 10I:
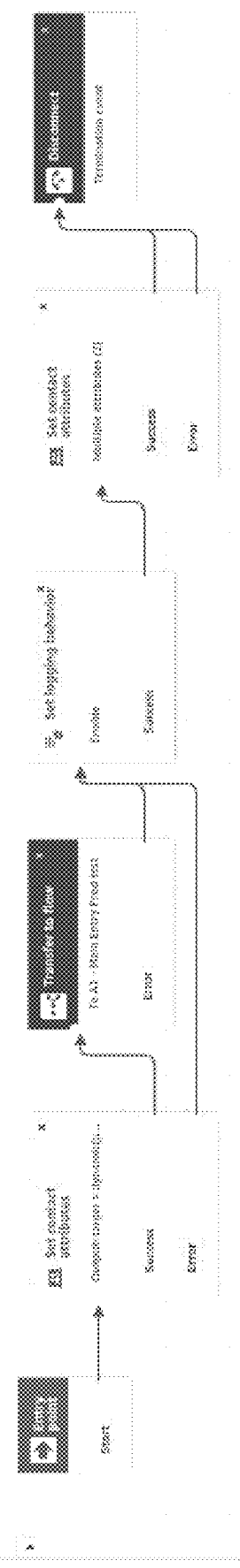
Figure 10J:
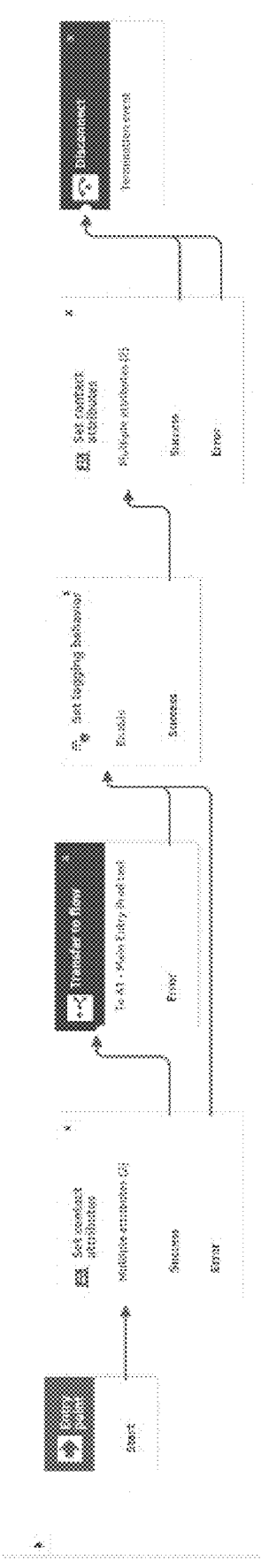
Figure 10K:
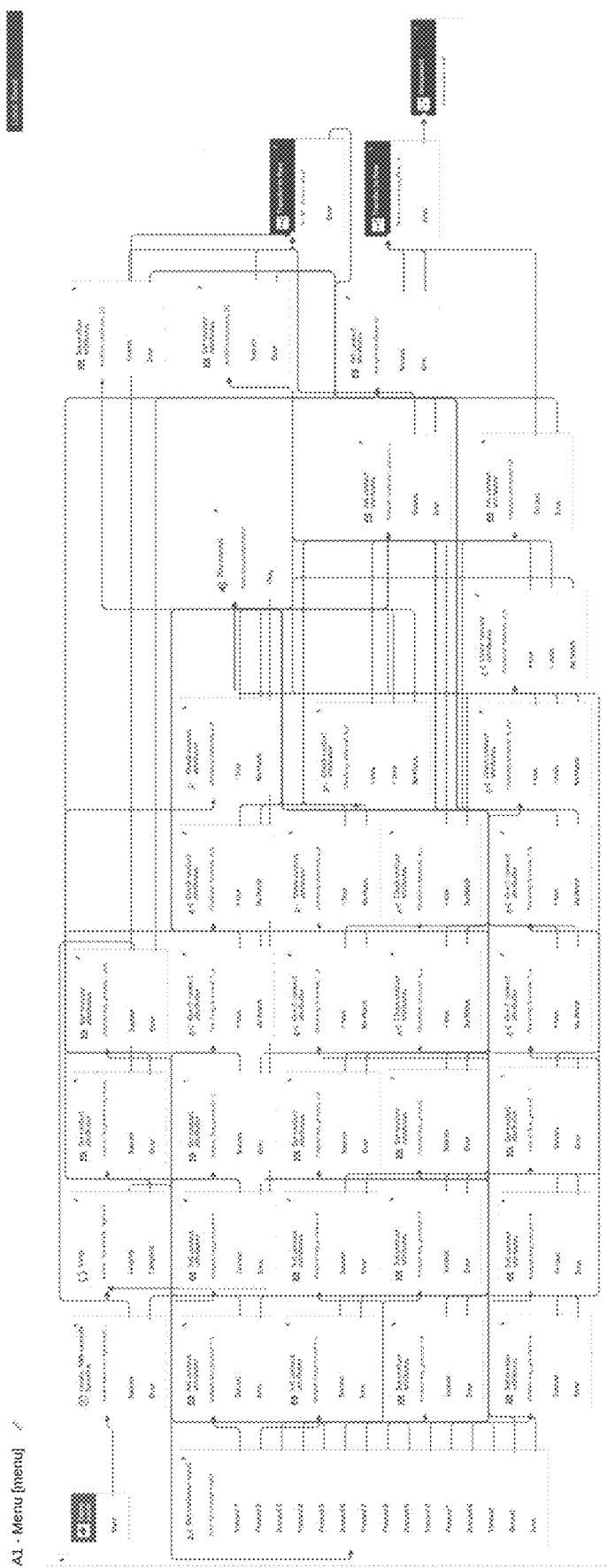
Figure 10L:
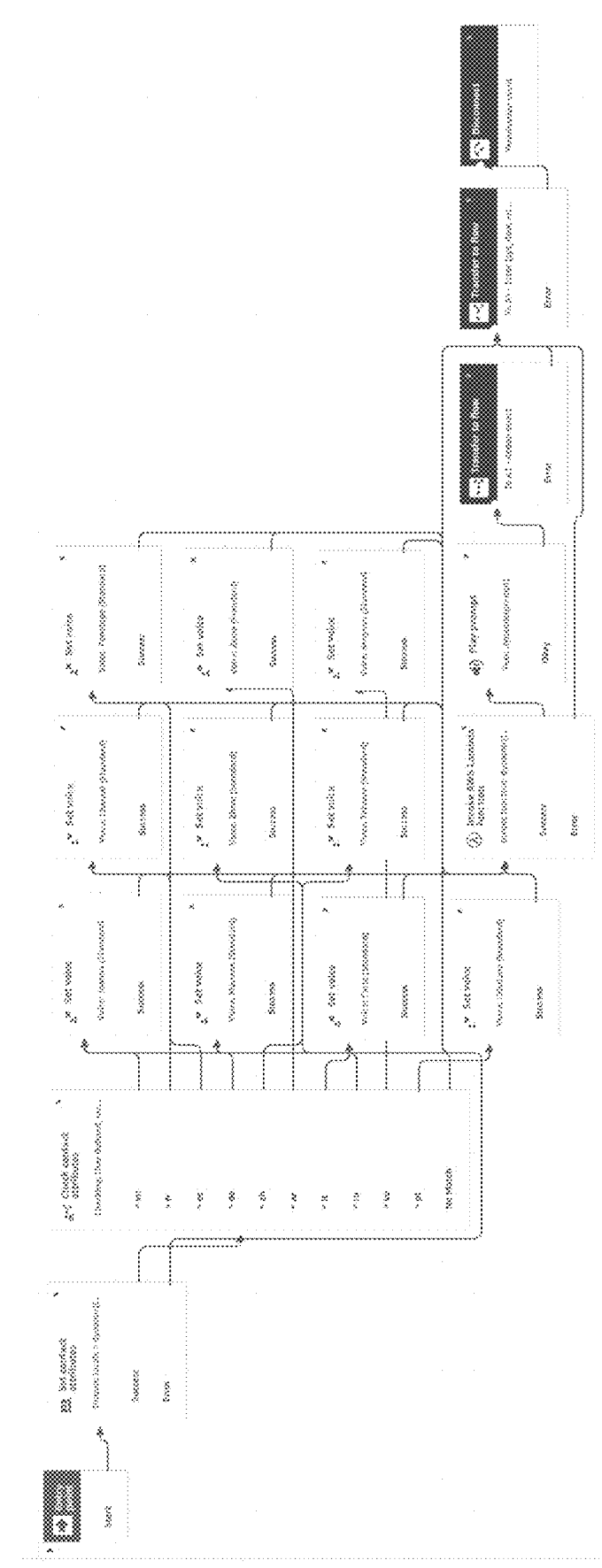
Figure 10M:
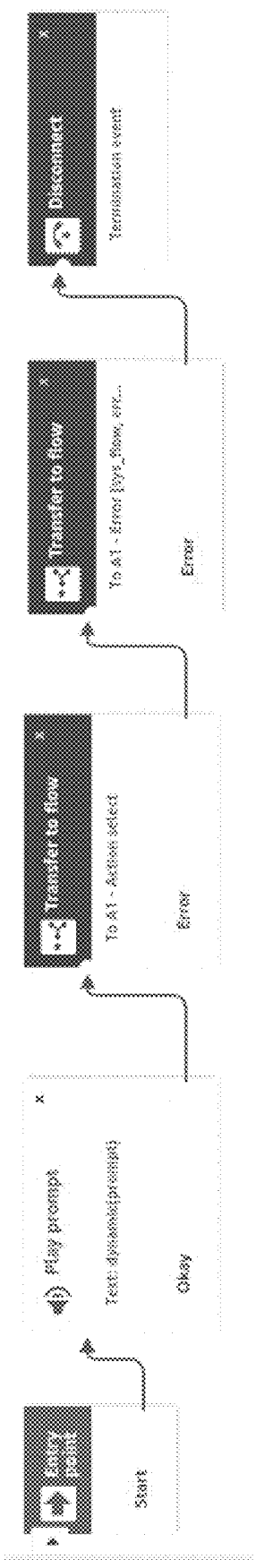
Figure 10N:
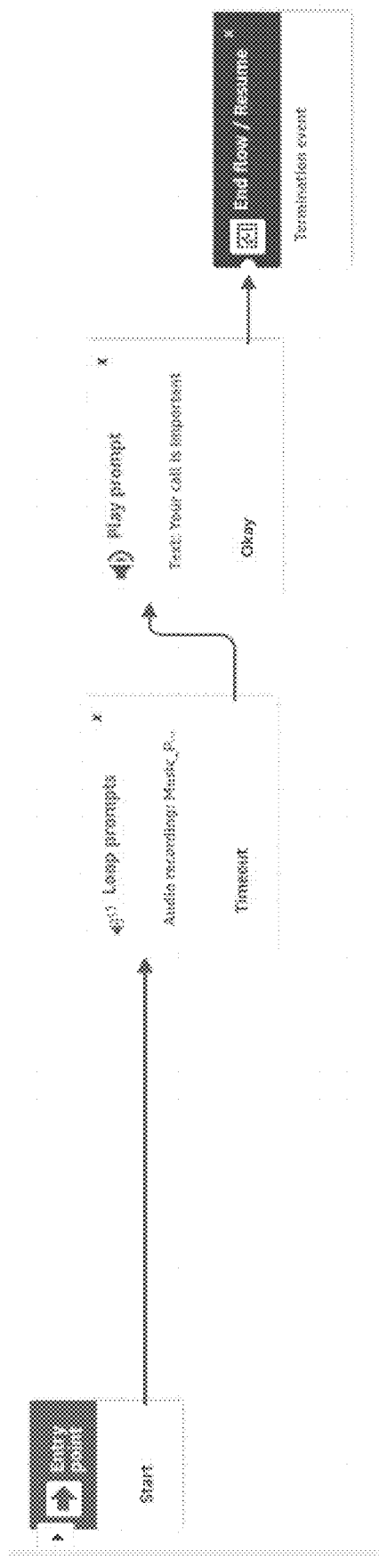
Figures 10O, 10P:
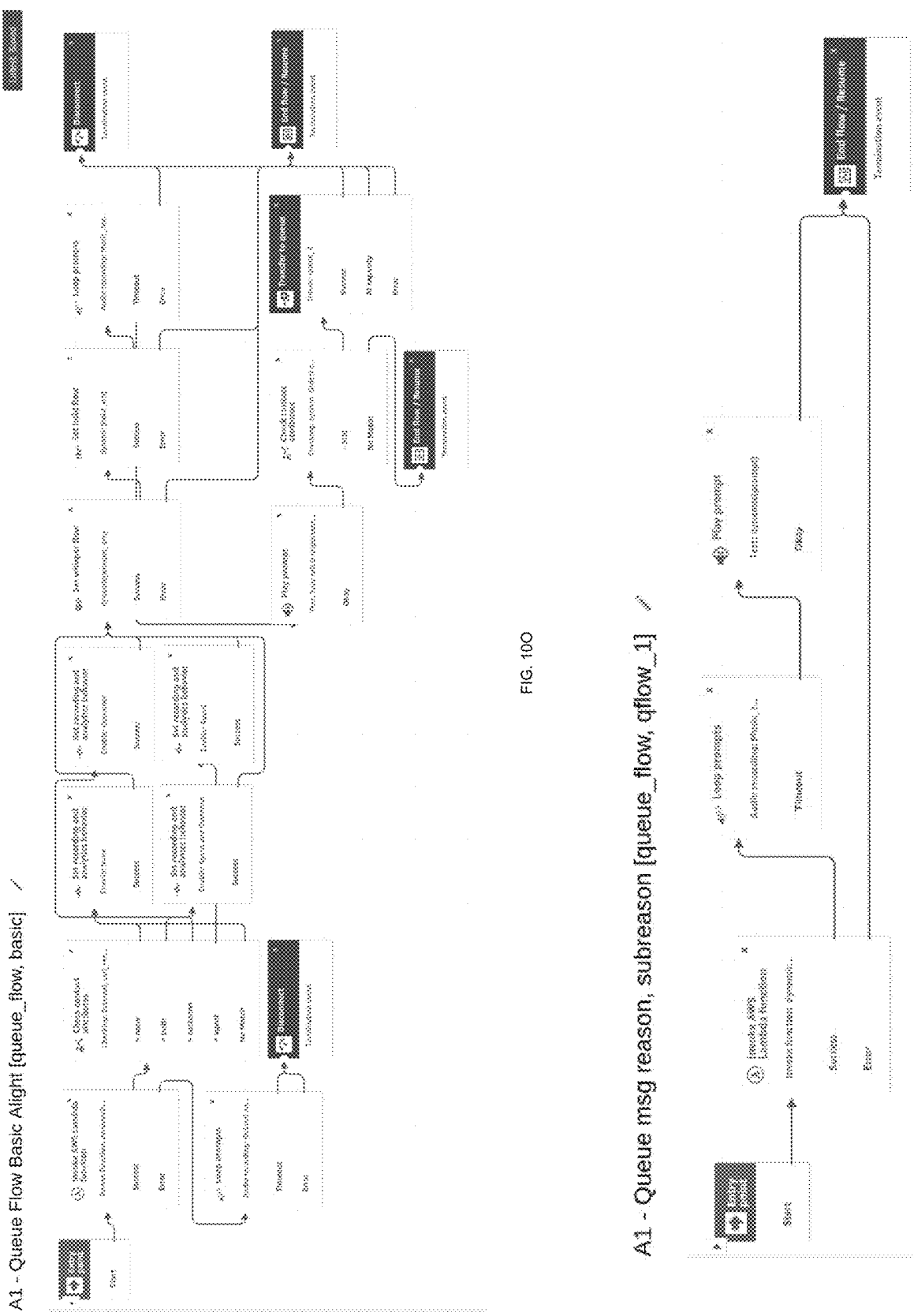
Figure 10Q:
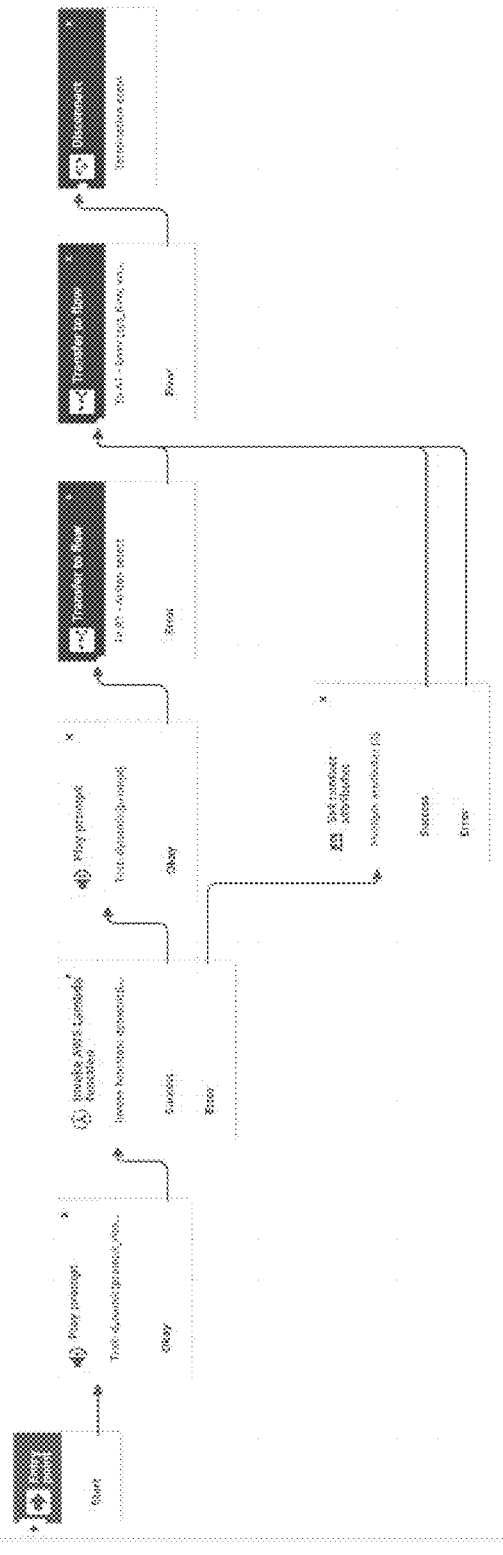
Figure 10R:
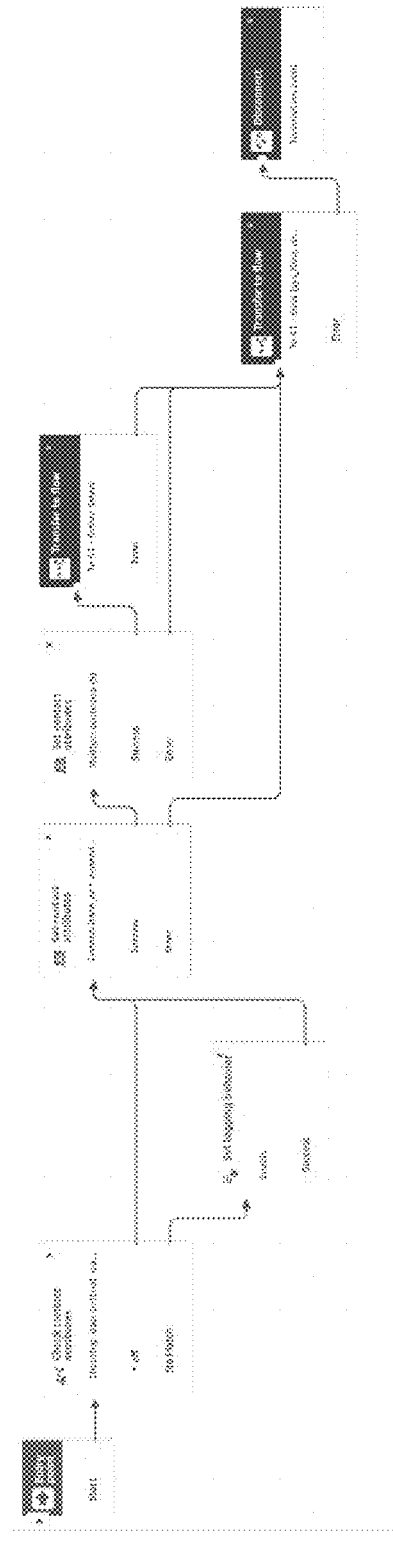
Figure 10S:
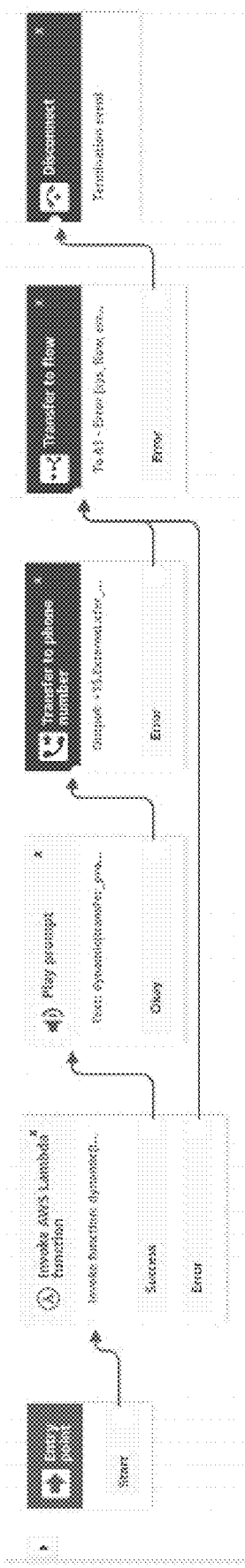

Table 6 shows a list of embodiments of the microflows. These show A level microflows. Also, FIGS. 10A to 10S show embodiments of implementations of these microflows. In other embodiments, there are microflows that interact and depend on other microflows. For example, B level microflows may only execute after the A level microflows have finished executing.

Figure 11:
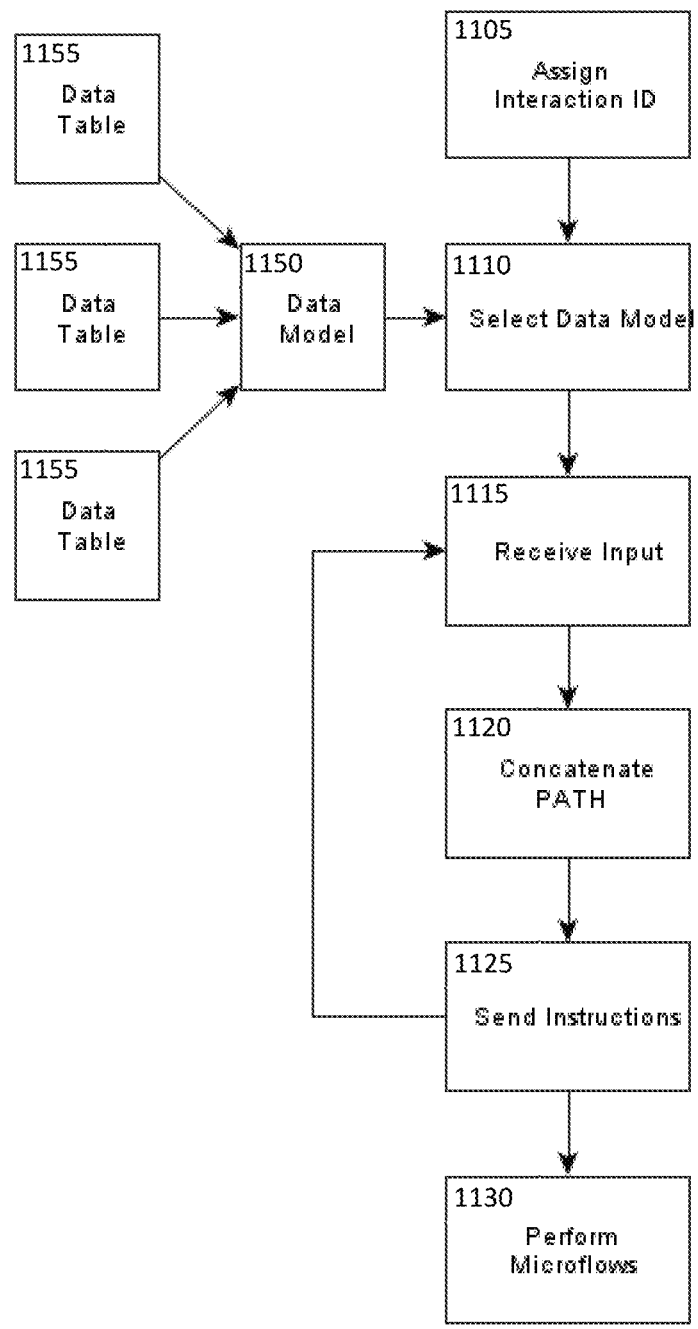
FIG. 11 depicts a block diagram of a method according to an embodiment.

FIG. 11 illustrates a block diagram of a method of managing multiple real-time interactions with a Communication Platform as a Service (CPaaS) system according to an embodiment. Initially, a unique interaction ID is assigned (1105) to each interaction with a user. Then, a data model is selected (1110) for each interaction based on a system endpoint and customer endpoint for each interaction and the data model is associated with the interaction ID. The data model (1150) represents the possible interaction sequence for the interaction (communication flow) and the data model is compiled from of or more data tables (1155). Each data table is comprised of a set of interaction states, one or more associated variables as required for the operation of each interaction state, and a state variable (PATH) value associated with the interaction state and the interaction ID.

TABLE 6

| Name | Type | Description |
| --- | --- | --- |
| A1-Action Select | Contact flow | Based on Action parameter, establish next flow and transfer |
| A1-Action Select legacy | Contact flow | Based on Action parameter, establish next flow and transfer |
| A1-Action Select multimodel | Contact flow | Based on Action parameter, establish next flow and transfer |
| A1-Default Queue Flow [queue_flow default] | Customer queue | Default audio played when a customer is waiting in queue, |
| A1-End Call [sys_ flow, end_call] | Contact flow | Hang up the call, no other action |
| A1-Error [sys_flow, error] | Contact flow | Set up for action for a DTMF input |
| A1-Go to next path [sys_flow, next_path] | Contact flow | Go to path in the next path field |
| A1-Main Entry Common | Contact flow | Entry point for all calls |
| A1-Main Entry Dev | Contact flow | IVR Select |
| A1-Main Entry Prod | Contact flow | IVR Select |
| A1-Main Entry Stage | Contact flow | IVR Select |
| A1-Menu [menu] | Contact flow | Menu-ServiceNow version |
| A1-Multi language entry [first_flow, multi_lang_entry] | Contact flow | Selects language Based on locale from init |
| A1-Play message [message] | Contact flow | Plays a single prompt message. ed for menu selections that provide info |
| A1-Queue Flow 3 | Customer queue | Custom queue flow treatment 3 |
| A1-Queue Flow Basic Alight [queue_flow, basic] | Customer queue | Custome queue flow treatment 2 |
| A1-Queue msg reason, subreason [queue_flow, qflow_1] | Customer queue | Play status message with reason, subreason |
| A1-Return to main [sys_flow, return_to_main] | Contact flow | Passthrough flow so main flow ID doesn't have to be hardcoded |
| A1-Switch model [switch_account] | Contact flow | Gets settings for related model. |
| A1-Transfer to external line [xfer] | Contact flow | Transfer customer to another number |

While some the examples herein are directed to IVR systems, it is to be understood that the system and method applies broadly to CPaaS systems, whether IVR, text, video or combinations thereof. As modern contact centers transition to newer technologies through CPaaS, the present system and method are designed to support these changes and technologies and further to enable the transition with the potential for reduced capital effort and expenditure.

User input is received (1115) and each user input is concatenated (1120) into the associated state variable (PATH) such that each state variable value corresponds to the sequence of user inputs (1115) received during the interaction for the associated interaction ID (1105). Instructions are then sent (1125) to the CPaaS system to perform one or more microflows (1130) as based on the data model (1150) and the state variable (PATH), with each microflow comprising a set of response to user input and options for further user input, and the instructions further containing the variables from the data tables (1155). This sequence is then repeated as necessary in order to complete the customer interaction.

Figure 12:
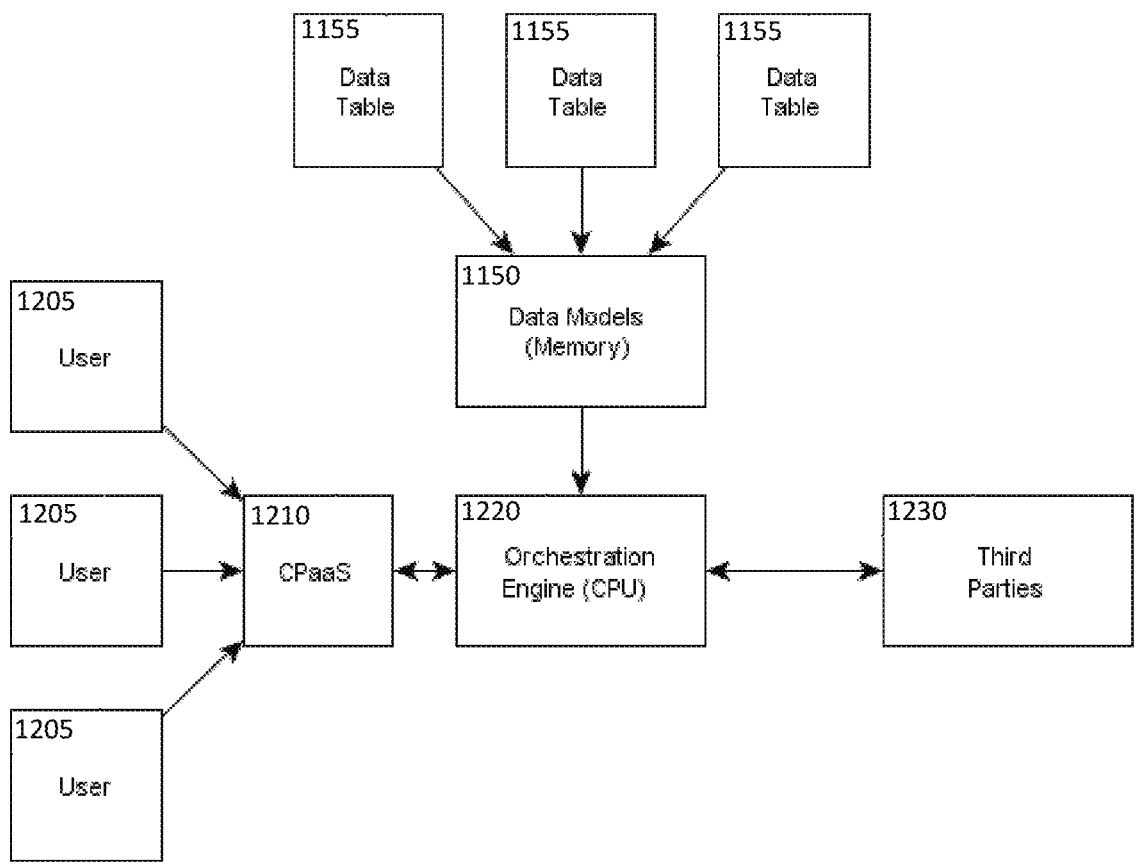
FIG. 12 depicts a block diagram of a system according to an embodiment.

FIG. 12 illustrates a block diagram for a system performing the method of managing multiple real-time interactions with a Communication Platform as a Service (CPaaS) system. Users (1205) connect to the CPaaS system (1210) which is controlled by the orchestration engine (1220) running on a CPU of a computer or a server or a cloud computing server. The data models (1150) for the orchestration engine (1220) are stored in connected memory. The data tables (1155) may be stored in the same memory, or in a separate memory or database. The orchestration engine may further be connected to third parties (1230) to exchange additional information, where required.

It should also be noted that the steps described in the method of use can be carried out in many different orders according to user preference. The use of "step of" should not be interpreted as "step for", in the claims herein and is not intended to invoke the provisions of 35 U.S.C. § 112(f). It should also be noted that, under appropriate circumstances, considering such issues as design preference, user preferences, marketing preferences, cost, structural requirements, available materials, technological advances, etc., other methods are taught herein.

The embodiments of the invention described herein are exemplary and numerous modifications, variations and rearrangements can be readily envisioned to achieve substantially equivalent results, all of which are intended to be embraced within the spirit and scope of the invention. Further, the purpose of the foregoing abstract is to enable the patent office and the public generally, and especially the scientist, engineers and practitioners in the art who are not familiar with patent or legal terms or phraseology, to determine quickly from a cursory inspection the nature and essence of the technical disclosure of the application.

The present invention may be embodied in other specific forms without departing from the spirit or essential characteristics thereof. Certain adaptations and modifications of the invention will be obvious to those skilled in the art. Therefore, the presently discussed embodiments are considered to be illustrative and not restrictive, the scope of the invention being indicated by the appended claims rather than the foregoing description and all changes which come within the meaning and range of equivalency of the claims are therefore intended to be embraced therein.

What is claimed is:

1. A method of managing multiple real-time interactions with a Communication Platform as a Service (CPaaS) system, comprising:
   a) assigning a unique interaction ID to each interaction with a user;
   b) selecting a data model for each interaction based on a system endpoint and a customer endpoint for each interaction and associating the data model with the interaction ID, the data model representing the possible interaction sequences for the interaction, the data model compiled from one or more data tables, each data table comprising:
      a set of interaction states;
      one or more associated variables required for operation of each interaction state; and
      a state variable (PATH) value associated with the interaction state and the interaction ID;
   c) receiving user inputs to the CPaaS system, each user input concatenated into the associated state variable (PATH) such that each state variable value corresponds to the sequence of user inputs received during the interaction for the associated interaction ID;
   d) sending instructions to the CPaaS system to perform one or more microflows based on the data model and the state variable, each microflow comprising a set of responses to the user input and options for further user input, the instructions comprising variables from the data tables;
   e) executing steps c) and d) as needed until the interaction is completed.

2. The method of claim 1, wherein each data model is independent of the microflows such that multiple data models may instruct performance of one same microflow during operation.

3. The method of claim 1, wherein the data tables are independent of each data model such that each data table may be used in multiple data models.

4. The method of claim 1, wherein the data tables are provided in a tabular form as one of: comma separated values (CSV), a spreadsheet, a relational database and a non-relational database.

5. The method of claim 1, further comprising locking each data model to an existing version during the interaction such that each interaction proceeds under the existing version while the data model is being updated to a newer version.

6. The method of claim 1, further comprising sending and receiving information from third party sources during each interaction and presenting the information to the user during the interaction.

7. The method of claim 6, wherein the information may be applied to modify the state variable for the interaction.

8. The method of claim 1, wherein the CPaaS system comprises a text-based chat bot and further comprising a step of converting user text input from the chat bot into voice instructions.

9. The method of claim 1, wherein the CPaaS system comprises an Interactive Voice Response (IVR) system, the interaction is a call, the system endpoint is a number called by the user and the customer endpoint is a number the user is calling from.

10. The method of claim 9, wherein the user input may result in selecting a new data model associated with a different number and changing to the new data model without requiring a change in the interaction ID or redirecting the call to the different number.

11. A system for managing multiple real-time interactions with a Communication Platform as a Service (CPaaS) system, comprising:
   a) a central processing unit (CPU);
   b) a memory module coupled to the CPU; and
   c) a CPaaS system comprising a user interaction system for performing the steps of:
      a) assigning a unique interaction ID to each interaction with a user;
      b) selecting a data model for each interaction based on a system endpoint and a customer endpoint for each interaction and associating the data model with the interaction ID, the data model representing the possible interaction sequences for the interaction, the data model compiled from one or more data tables, each data table comprising:
         a set of interaction states;
         one or more associated variables required for operation of each interaction state; and
         a state variable (PATH) value associated with the interaction state and the interaction ID;

c) receiving user inputs to the CPaaS system, each user input concatenated into the associated state variable (PATH) such that each state variable value corresponds to the sequence of user inputs received during the interaction for the associated interaction ID;

d) sending instructions to the CPaaS system to perform one or more microflows based on the data model and the state variable, each microflow comprising a set of responses to the user input and options for further user input, the instructions comprising variables from the data tables;

e) executing steps c) and d) as needed until the interaction is completed.

12. The system of claim 11, wherein each data model is independent of the microflows such that multiple data models may instruct performance of one same microflow during operation.

13. The system of claim 11, wherein the data tables are independent of each data model such that each data table may be used in multiple data models.

14. The system of claim 11, wherein the data tables are provided in a tabular form as one of: comma separated values (CSV), a spreadsheet, a relational database and a non-relational database.

15. The system of claim 11, further comprising locking each data model to an existing version during the interaction such that the interaction proceeds under the existing version while the data model is being updated to a newer version.

16. The system of claim 11, further comprising sending and receiving information from third party sources during the interaction and presenting the information to the user during the interaction.

17. The system of claim 16, wherein the information may be applied to modify the state variable.

18. The system of claim 11, wherein the CPaaS system comprises a text-based chat bot and further comprising a step of converting user text input from the chat bot into voice instructions for an IVR system.

19. The system of claim 11, wherein the CPaaS system comprises an Interactive Voice Response (IVR) system, the interaction is a call, the system endpoint is a number called by the user and the customer endpoint is a number the user is calling from.

20. The system of claim 19, wherein the user input may result in selecting a new data model associated with a different number and changing to the new data model without requiring a change in the interaction ID or redirecting the call to the different number.

21. A method of managing interactions with a Communication Platform as a Service (CPaaS) system, comprising:
   a) assigning a unique interaction ID to an interaction with a user;
   b) selecting a data model for the interaction based on a system endpoint and a customer endpoint for the interaction and associating the data model with the interaction ID, the data model representing the possible interaction sequences for the interaction, the data model compiled from one or more data tables, each data table comprising:
      a set of interaction states;
      one or more associated variables required for operation of each interaction state; and
      a state variable (PATH) value associated with the interaction state and the interaction ID;
   c) receiving a user input to the CPaaS system, the user input concatenated into the state variable (PATH) such that the state variable value corresponds to the sequence of user inputs received during the interaction;
   d) sending instructions to perform one or more microflows based on the data model and the state variable, each microflow comprising a set of responses to the user input and options for further user input, the instructions comprising variables from the data tables;
   e) executing steps c) and d) as needed until the interaction is completed.

* * * * *